(12) United States Patent
Hamm

(10) Patent No.: US 8,788,412 B1
(45) Date of Patent: Jul. 22, 2014

(54) SYSTEM AND METHOD FOR TAX FILING, DATA PROCESSING, DATA VERIFICATION AND RECONCILIATION

(76) Inventor: Noel Hamm, Bentonville, AR (US)

(*) Notice: Subject to any disclaimer, the term of this patent is extended or adjusted under 35 U.S.C. 154(b) by 0 days.

(21) Appl. No.: 13/603,400

(22) Filed: Sep. 4, 2012

Related U.S. Application Data

(60) Provisional application No. 61/696,421, filed on Sep. 4, 2012, provisional application No. 61/530,674, filed on Sep. 2, 2011.

(51) Int. Cl.
*G06Q 40/00* (2012.01)
(52) U.S. Cl.
CPC .................................... *G06Q 40/123* (2013.12)
USPC .......................................................... 705/39
(58) Field of Classification Search
USPC .......................................................... 705/39
See application file for complete search history.

(56) References Cited

U.S. PATENT DOCUMENTS

| | | | | |
|---|---|---|---|---|
| 5,361,393 | A * | 11/1994 | Rossillo | 713/1 |
| 5,772,251 | A * | 6/1998 | Fleck | 283/115 |
| 5,799,283 | A * | 8/1998 | Francisco et al. | 705/19 |
| 6,064,983 | A * | 5/2000 | Koehler | 705/31 |
| 8,255,257 | B2 * | 8/2012 | Bhatt | 705/7.19 |
| 2004/0267595 | A1 * | 12/2004 | Woodings et al. | 705/9 |
| 2006/0282356 | A1 * | 12/2006 | Andres et al. | 705/35 |

OTHER PUBLICATIONS

Journal_of_Accountancy; "Products & Services for CPAs—The Goods"; Nov. 1991.*
Electronic_Commerce_News; "Prepare Now to Keep Your Company Tax-Compliant"; Jan. 20, 1997.*

* cited by examiner

*Primary Examiner* — Edward Chang
(74) *Attorney, Agent, or Firm* — Kutak Rock LLP; Bryan P. Stanley

(57) ABSTRACT

A system and method for processing transaction and use tax data, verifying tax calculations/determinations, reconciling calculation/determination errors, and filing and/or paying taxes owed to the appropriate jurisdictions is provided.

26 Claims, 18 Drawing Sheets

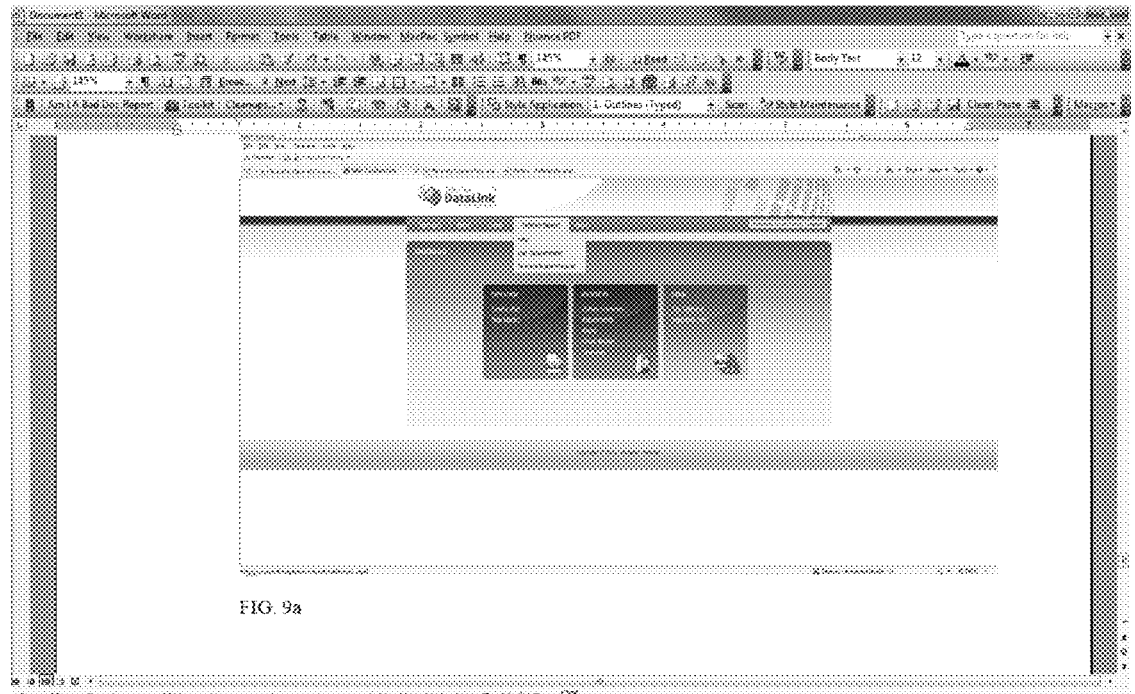
FIG. 9a
FIG. 9b
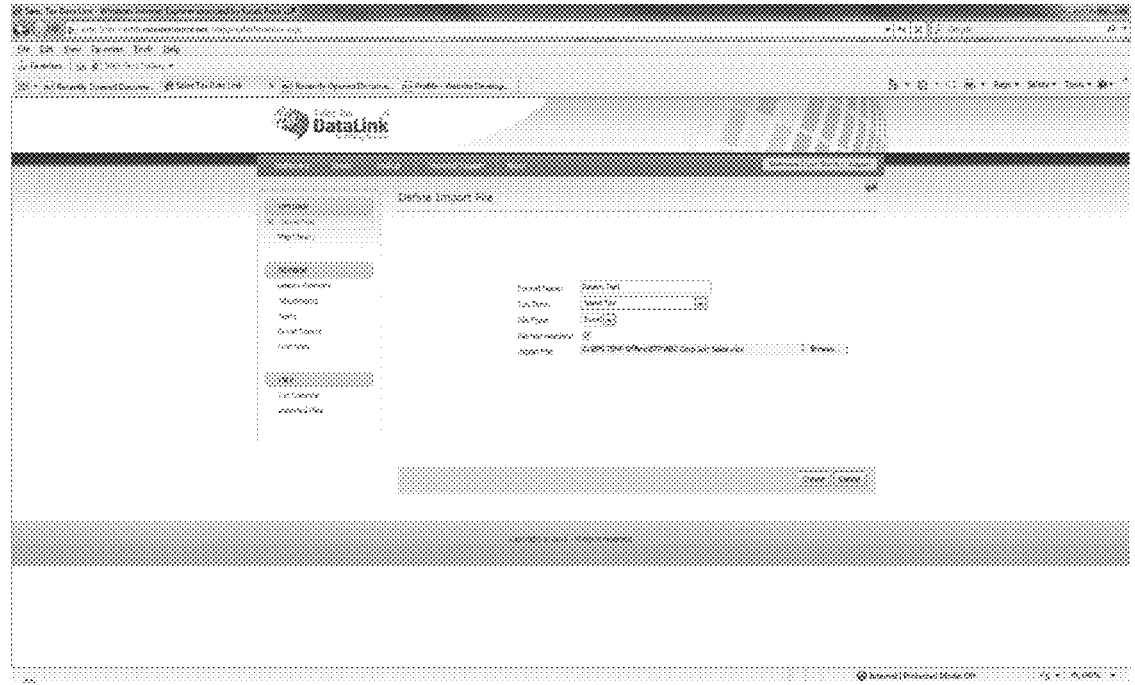
FIG. 10a

Fig. 18

SYSTEM AND METHOD FOR TAX FILING, DATA PROCESSING, DATA VERIFICATION AND RECONCILIATION

CROSS-REFERENCE TO RELATED APPLICATIONS

This application claims priority pursuant to 35 U.S.C. 119(e) to U.S. Provisional Patent Application Ser. No. 61/530,674, filed Sep. 2, 2011, and U.S. Provisional Patent Application Ser. No. 61/696,421, filed Sep. 4, 2012, the entire disclosures of which are incorporated herein by reference.

FIELD OF THE INVENTION

The present invention relates generally to the field of data processing, verification, reconciliation and reporting. More particularly, the present invention relates to a system and method for processing transaction and use tax data, verifying tax calculations/determinations, reconciling calculation/determination errors, and filing and/or paying taxes owed to the appropriate jurisdictions.

BACKGROUND OF THE INVENTION

The collection and filing of transaction (and/or use) tax for the sale of goods and/or services is an increasingly difficult task for many businesses, particularly with the sale of goods/services to customers across many different tax jurisdictions.

Generally, a business will have nexus (i.e. a connection or presence) with, and therefore be required to file and submit payment of tax to, a state or other jurisdiction if it has any two of the following: sales within the jurisdiction; physical property in the jurisdiction; or employee/affiliation in the jurisdiction. Within a single jurisdiction, sales taxes may be required from multiple levels of government within the jurisdiction; for example, taxes may be required at the local, special, city, county and state levels, all in differing amounts and varying in amounts charged by different jurisdictions at a single level (i.e. each state has its own tax structure, or home rule states that release the taxing authority down to each county within a state and sets its own tax rate, and each city sets and its own rate, etc.).

A number of rules-based tax calculation engines currently exist that help businesses calculate the appropriate taxes at the transaction level for sales of goods/services within a particular jurisdiction. Nevertheless, such systems often lack the ability for users to verify tax data, check for errors and reconcile errors with the filing workflow. Moreover, many tax filing systems do not provide for data generated (EDI, XML, CSV) through a single sourced application owed in appropriate jurisdictions. Those systems that do provide for electronic filing of tax statements typically generate forms with tax data that require data from the forms to be separately keyed in by a system user or uploaded using a rigid data layout for a particular jurisdiction in which electronic filing is being made. Furthermore, to the extent current tax engine filing systems do generate sales tax data in a format that can be electronically filed, such systems which are designed specifically as not customer driven, are a considerable investment for businesses and usually require complete replacement of existing systems for which the businesses have already obtained at a considerable expense.

Therefore, it would be beneficial to provide a system that allows tax data to be generated by an existing tax filing system and processed/prepared, verified and/or reconciled by the inventive system, reviewed by a user, and/or formatted for and/or filed electronically with the appropriate jurisdiction.

SUMMARY OF THE INVENTION

The instant invention provides a system and method for processing transaction and use tax data from a data file(s), verifying tax calculations/determinations that have already been completed (i.e. through a separate tax calculation engine system), reconciling calculation/determination errors, creating overrides, data maintenance presenting data for review and filing to the appropriate jurisdictions as a customer driven solution.

In one embodiment, the system of the instant invention is a web/cloud-based computer program or service, or other third-party hosted service, that is associated with one or more databases. The computer program is a central or remote application that is operated by a third party that is independent of system users.

In one embodiment of the inventive concept, a system user contacts the service provider to sign up for the service and receives a user name and password, which are stored in one or more databases that are accessible by the computer program to verify a user and allow access to the system. The user then accesses the system via a website portal, enters username and password and the computer program compares the username and password to user information stored in the database(s) accessible by the computer program. If the username and password combination are valid, the computer program directs the user to a secure webpage dashboard that allows the user limited access to one or more databases accessible through the computer program. Depending upon a user's access rights, which are defined by data stored in the database(s) and associated with the user's login information, the computer program will allow the user to view and edit information in several databases and/or fields in the database(s).

Depending upon a user's access rights, a user may use the computer program of the instant invention to: create/modify data stored in database(s) accessible by the user via the computer program regarding the user and other added user's of the system; create/modify data in database(s) accessible by the user via the computer program regarding company's for which a user will utilize the system with respect to data preparation, review, e-filing, etc. of taxes; create/modify data in database(s) accessible by the user via the computer program regarding jurisdictions that are associated with each company; and create/modify data in database(s) accessible by the user via the computer program regarding physical locations of each company within a particular jurisdiction.

A user also may access information stored in database(s) accessible by the computer program regarding tax rates for a particular jurisdiction during a particular time period. The computer program will link the user to the USPS website to look up information regarding a ZIP code for a particular address, in the event address information appears to be incorrect in the data from the user. The computer program further allows a user to access various types of data for technical support and data about the system, which is stored in one or more databases accessible by the computer program.

Once a user has populated the appropriate database(s) with information regarding users, companies, company jurisdictions and physical locations, the user is ready to initiate the processing of data by the inventive system. First, the user selects the Create Map option from the dashboard and selects a data file (such as an Excel spreadsheet file that is generated from the user's tax calculation engine system) for upload into a mapping database of the system that is accessible by the computer program. Once the file is uploaded, the computer program populates a database with data column labels that the computer program obtains from the columns in the data file and displays to the user a source list. The computer program then allows the user to select destination fields for each source field that the user desires to map to the system of the instant invention. The computer program will display an error message if the user fails to map key data fields necessary for use of the system to process sales tax data from a data file. Once the minimum data fields are populated, the computer program stores the map in a database(s) accessible by the computer program. The finished map basically tells the computer program what the data is in each column of the data file that is being uploaded, and where in the database that keeps sales tax data for each company, that data is supposed to be stored for use by the computer program in processing the data. If a particular column is not mapped from the source file, when the file is uploaded into the database(s) of the inventive system, the data from those columns is not uploaded and/or stored in the database(s) of the instant system. Only data from mapped columns is stored.

Once a data source file has been mapped, the user can utilize the map to upload data from the data file (or another data file having the same format as the originally mapped file) into the system database(s). The user does this through the map library. The user selects the company for which the sales tax data applies from a dropdown on the map library page, selects the map that is desired (i.e. the map that was created by the user for the data file), and selects the data file to import.

Once the data file is imported/uploaded into the database(s) of the instant system, an upload summary is generated after the system imports and processes the data. In processing the data, the computer program checks the data for various errors or discrepancies (such as invalid address information, or tax collected for jurisdictions that have not been associated with the particular company in the databases of the instant system), and validates (using tax percentage information associated with each jurisdiction, which is stored in a database accessible by the compute program, and sales data from the data file) the total amount of tax that is due in each jurisdiction. The computer program also notifies the user if the total tax due in a jurisdiction differs from that which was collected and stored in the data file. The computer program alerts users and allows the user to take action to correct errors and/or instruct the program what action to take with respect to the error, and the computer program stores the instructed action in a database to allow the computer program to take the appropriate action when filing in the impacted jurisdiction. The computer program allows a user to make adjustments and overrides to correct errors from or adjustments to the data in the data file, which may be recurring in subsequent data files. Overrides can be globally stored in a database, so the computer program takes the appropriate action in the future when similar errors (or situations that are not errors) occur in future uploads. In addition, the computer program stores in its databases information regarding credits the company may have in certain jurisdictions and identifies and alerts the user if credits are available and can be applied within the jurisdiction or to other jurisdictions and allows the user to instruct the computer program to take appropriate action with respect to such credits. The computer program stores information regarding credits from a period that are not applied in that period are stored in the database(s) in association with the company and jurisdiction for application at a later date. Additional information regarding these tools is shown in the user manuals of Exhibit B attached to U.S. Provisional Patent Application Ser. No. 61/530,674, filed Sep. 2, 2011, and Exhibit B attached to U.S. Provisional Patent Application Ser. No. 61/696,421, filed Sep. 4, 2012, the entire disclosures of which are incorporated herein by reference.

Once data from one or more data files is uploaded and processed by the inventive system, the user can view a graphical calendar that shows the user in a color coded manner dates in which actions with respect to sales tax filings have been made, are coming due, or are overdue. The user can select a date and the computer program will display a list of jurisdictions in which filings are due (or overdue) on that date for the selected company. The user can then drill down by selected TFS link to show the amounts due within a jurisdiction, and then proceed to have the computer system format the data for filing electronically in the appropriate jurisdiction (if available), or export the data in another format (such as Excel). Once electronic filing is completed, the computer program updates the database(s) accordingly such that the graphical calendar shows the filing as completed and no longer due, and records a confirmation number (if received) for the electronic filing in a database associated with the company and jurisdiction.

The instant invention automates many aspects of the data preparation, review and filing process. It allows multi-state businesses, including CPAs, to control the workflow themselves from a back office dashboard. An interlocking data file upload process manages tax data errors. The instant invention includes post-tax calculation overrides, credit maintenance and adjustment functionality. It identifies potential problems via instant Alert Notifications. Then the inventive system generates reports in a variety of formats with real time reconciliation and variance notification down to the local level, providing EDI, XML and CSV exports as a self-managed option.

Embodiments of the instant inventive concept includes a method of processing tax data for sales or purchase of goods or services, said method comprising the steps of: uploading a data file containing information regarding taxes collected or paid for a plurality of transactions into a database accessible by a customer-administered mapping tool of a computer program; obtaining by said mapping tool information from column headers of said data file; populating a source field table of said database with said information from column headers of said data file; displaying said source field table of said database to a system user of said computer program, the system user being a customer-type user of said computer program that utilizes said computer program for processing tax data provided by the system user; providing the system user destination field selection options for association with each record in said source field table; storing in a destination field table of said database the destination field selection option selected by the system user for association with each record in said source field table; saving said source field table and said destination field table in said database as a source file map; and utilizing said source file map to process by said computer program a data file containing information regarding taxes collected or paid for a plurality of transactions. In one such embodiment said data file processed in said utilizing step is the data file stored in said database in said uploading step. In another such embodiment, said data file processed in said utilizing step is a different data file from the data file stored in said database in said uploading step. In another embodiment said computer program provides a real-time alert to the system user if a required destination field selection option is not included in said source file map, if said computer program identifies a data error in said data file processed in said utilizing step, if said computer program identifies a formatting discrepancy between the types of data or how data is laid out in said source file map and said data file processed in said utilizing step, or if said computer program identifies a discrepancy between setup fields relating to the system user or the source file map and said data file processed in said utilizing step. Another such embodiment further comprises the step of ignoring during said utilizing step any source field or fields of a record in said data file that were not associated by the system user with a destination field selection option.

Other embodiments of the instant inventive concept comprise a method of processing tax data for sales or purchase of goods or services, said method comprising the steps of: uploading a data file containing information regarding taxes collected or paid for a plurality of transactions into a database accessible by a computer program; processing said data file by said computer program; displaying to a system user of said computer program information relevant to one or more records of said data file in said database after said processing step, the system user being a customer-type user of said computer program that utilizes said computer program for processing tax data provided by the system user; allowing the system user to input an action to be taken with respect to said displayed information; storing said inputted action in said database in association with said one or more records to which said displayed information is relevant; utilizing said inputted action for further processing of said one or more records; and displaying to the system user updated information relevant to said one or more records following said utilizing step. One such embodiment further comprises the steps of: allowing the system user to input an other action to be taken with respect to said displayed updated information; utilizing said inputted other action for further processing of said one or more records; and displaying to the system user updated information relevant to said one or more records following said step of utilizing said inputted other action. In another such embodiment said inputted action is stored in a separate field in said one or more records from said information stored in said database in said uploading step. In another embodiment, said information stored in said database in said uploading step remains in said database separate from said inputted action and without altering, deleting, updating or otherwise modifying said information stored in said database in said uploading step. In still another embodiment at least of portion of said information stored in said database in said uploading step is ignored during said utilizing step. In another embodiment said inputted action is utilized for processing of one or more other records of said data file or of an other data file uploaded into said database. In yet another embodiment said inputted action corrects a data error in said one or more records of said data file, reconciles a formatting discrepancy between the types of data or how data is laid out in a source file map and said data file, overrides data in said one or more records of said data file, or overrides data associated with other records or other data files. In one other embodiment said inputted action applies a net credit taxes collected or paid for a particular transaction toward a future tax liability or to a like kind tax jurisdiction. In another embodiment said computer program provides in said allowing step a list of actions that may be inputted by said system user. In one such embodiment the list of actions is determined by said computer program during said processing step. In another embodiment said information relevant to said one or more records displayed in said displaying steps comprises a variance analysis of said information in said data file or any updated information regarding taxes collected or paid compared to taxes calculated through a validation engine of said computer program based upon said information in said data file or any updated information.

Other embodiments of the instant inventive concept include a method of processing tax data for sales or purchase of goods or services, said method comprising the steps of: uploading a data file containing information regarding taxes collected or paid for a plurality of transactions into a database accessible by a computer program; processing said data file by said computer program; selecting by said computer program one or more jurisdictions in which one or more tax filings are recommended to be based upon said information in said data file; reporting to a system user said one or more jurisdictions recommended by said computer program, the system user being a customer-type user of said computer program that utilizes said computer program for processing tax data provided by the system user.

Another embodiment comprises the steps of: displaying to the system user of said computer program a pre-determined time period of estimated tax due in said one or more jurisdictions recommended by said computer program.

Another embodiment of the instant inventive concept comprises the step of generating an interactive tax calendar continuously responsive to actions of said system user related to said one or more tax filings. In some such embodiments said tax calendar is color coded and updated based upon which step of the process a particular tax filing exists that has been generated or recommended by the computer program.

An embodiment of the inventive concept includes a web based solution that combines a validation engine, electronic filing solution, tax rate lookup and tax calendar, integrated as a single, seamless application for sales, use and vendor use tax.

Some embodiments of the inventive concept utilize Data Tumbling: Real time processing; system recalculation in response to each button clicked (no "bad data in—bad data out"). Bad data comes in and a system user of the instant invention fixes it with a click and the system recalculates and adjusts all modules with the revised data.

In some embodiments, the system of the instant inventive concept handles historic rates automatically—the system user does not have to upload separate files. They can upload a single file for multiple months and the compute program will processes based upon historic rate for the transaction date.

In some embodiments of the inventive concept, Set up, the process of entering data needed for the tax filing process, requires setup of—Users, Companies, Jurisdictions, Locations and Payments. Some embodiments of the inventive concept utilize a Voluntary Disclosure Review Option in which the computer program automatically pre-selects jurisdictions not requiring the system user to set up any users, companies, filing frequencies, locations and payment information. Monthly (or some other predetermined time period) running tax totals post into tax calendar/account total. A system User can review online or export a report that allows the user to assign registration priority by all jurisdictional levels.

Some embodiments include a self-managed mapping tool that allows a user to map their tax data file, independently with not restriction or deadlines. While the mapping process is as simple as connecting the dots, it is an important step in the set-up process. The purpose is to sync a user's tax data file layout with the computer program for correct tax reporting.

In some embodiments, the Map library is a repository of custom maps created by users or global data maps canned in the computer program and based upon common ERP data output files.

A flexible self mapping option allows user to create multiple maps in and through the computer program in lieu of IT creating a rigid data file that fits the application. Mapping technology of the inventive concept recognizes the data header on the uploaded file and pre-populates this information for easy mapping. If an item is not mapped correctly, the user can change just the troubled field without dumping the whole map. In preferred embodiments, the computer program reads the data file and automatically create the origin fields—half the map is automatically created. Once a tax map is created the client/system user selects and reuses the map each month.

Embodiments of the instant inventive concept include destination field headers organize by topic or alphabetically for the map. In some embodiments not all field headers have to be mapped. In some embodiments alerts tell the user if map is missing required information.

The programming of some embodiments of the system of the inventive concept interlocks with the tax data that a user uploads each month using a validation process. The purpose is to determine if the data has inconsistencies or problematic information that can corrupt the tax filing results. The results are published in the Upload Summary UI page for the user's review and processing; correcting errors prior to filing.

In some embodiments, the system of the instant inventive concept can consume an excel (or other format) data file that has embedded messages, additional content in secondary tabs, mixed data variables, mixed format types and cell formulas. In some embodiments, an system user may change bad data fields in the upload file and the system will apply correction instantly. The system user does not have to dump the data, fix and reload.

Some embodiments utilize Automated jurisdiction comparison for nexus validation. In some embodiments, the system can suppress data records that are not needed. In some embodiments one correction of data can parlay fixing multiple data errors.

Some embodiments of the inventive concept utilize a Proprietary Translation Dictionary: a Customized Database of data field names that are translated in the upload process i.e. Jefferson AFB to Jefferson Air Force Base or Village of Cammack to Cammack City.

Some embodiments of the inventive concept utilize Jurisdictional Harmony—the computer program of the inventive concept reviews jurisdiction levels, i.e. State, County, City, Special, city, Local and districts and confirms if any one element does not match the other(s) (i.e. listing of a city that is not located in the listed state). If there is a discrepancy, a data error is created in the upload summary for action by the system user. In this manner the computer system is not required to kick out the field or the whole record, which would result in misapplied data to a jurisdiction or dumped data.

Some embodiments include point and click links to overrides, jurisdictions, and/or credit modules that prepopulates record information. Some embodiments provide a running tax total by error code that automatically adjusts as an error is resolved. Some embodiments identifies record and field where the error occurs. When changes are made, in some embodiments, such changes are stored in a separate database and/or appended to the original record such that the original data is maintained intact in the database.

Some embodiments of the inventive concept allow for Adjustments to be made to data within the system: Adjustments are amounts that are not included in the tax data file upload, but are required for tax filing. Adjustments come in many forms. They can be lawful deductions, job credits, bad debt, and etc. Some adjustments are determined by the jurisdiction and presented to the user by formal documentation. Some are self-determined. In some embodiments, the adjustments are stored in a separate database and/or appended to the original record such that the original data is maintained intact in the database.

Some embodiments of the inventive concept allow for Credit Management: Many states will not accept negative amounts on a tax return. So, the taxpayer must roll forward the negative amount and net on next month's return, or apply for a refund. Some taxpayers apply the credit towards another local whereas the net amount is a net positive value. The Credit amount can be warehoused, providing a running total to applying toward a future month's values or apply to a like kind tax jurisdictions (same rate structure, i.e. state, county, city, etc.).

Some embodiments of the inventive concept include Alert Notification of credit amount and all jurisdictional levels.

Some embodiments of the inventive concept include a Credit Reports UI by company, return and period.

Some embodiments of the inventive concept include Override: Most tax calculation errors are because of limitations of the tax engine used for invoicing. As such, the override function in the inventive system provides the User the ability to correct, or redirect a tax transaction after tax calculation in the tax engine and prior to tax filing, periodically or reoccurring.

Some embodiments of the inventive concept include an Editable working list of overrides.

Some embodiments of the inventive concept include allow a user to Backdate and post-date overrides.

In some embodiments, overrides are Applied by jurisdiction, Post, Pre date, or All periods and by customer Some embodiments of the inventive concept include an Alerts Notification: the system of an embodiment of the inventive concept provides alert notifications throughout the application. These alerts trigger in response to actions taken when a user interfaces with various modules of the system. As support for the Alert, the system provides messaging to users that includes state regulations, law, rulings and annotations.

In some embodiments each Alert is preferred with an Alert icon followed by the blue, red, yellow or black text that indicates a level of urgency.

In some embodiments Alerts react to how the user is working in the system.

Some embodiments of the inventive concept include Reconciliation: The reconciliation process validates to the user that numbers required for tax filing are correct and justified. This includes an automated variance analysis using a valuation engine that shows discrepancies between tax collected and tax calculated. Some embodiments include Reports to users of the variances in the Account Total Module and Tax Filing Detail down to the lowest jurisdictional level.

In some embodiments Variances are color coded; Red=under taxed; Yellow over taxed.

Some embodiments of the inventive concept include Trouble Shooting: Troubleshoot icon on each module.

Some embodiments of the inventive concept include Automated Data Export: for EDI, XML and CSV files that are client controlled (creation to transmission of document).

Some embodiments of the inventive concept include Lookup: When validating a user's data for a tax filing, the user may find it necessary to review the tax rate or tax code for a period when the tax calculation occurred. The Tax Code Lookup provides codes and historical rates by jurisdictional level which can be queried by State, county, city or zip.

Some embodiments of the inventive concept include a Tax Calendar: a user's Tax Calendar provides a visual representation of the user's filing requirements by company, month and return that is expandable and interactive. A user's Tax Calendar tracks the user's specific return filing due dates. As such, no tax returns fall on the weekend or holidays in a preferred embodiment.

Some embodiments of the inventive concept include each tax filing date on the Tax Calendar is color-coded and responds as a user complete its filings; Green indicated filed timely, Red indicates a return was not filed timely and blue indicates a future required filing date.

In some embodiments if a user Clicks on the date the Tax Calendar expands showing specific tax returns due on that date. It provides a working list of returns that the user can navigate to the Tax Filing Summary.

A preferred embodiment integrates live interactive, navigable, three month viewing tax calendar showing filing status that can be queried by individual company or account.

In some embodiments, if a due date falls on a Saturday, Sunday or recognized holiday, return due dates either roll to the prior business day or to the next business day offering true business day return tracking.

Some embodiments of the inventive concept include Export options: Many jurisdictions accept files uploaded or data transmitted by EDI, XML, and CSV formats. The program of the inventive concept is designed to generate export files meeting the standards prescribed by these states. Users are provided full control and responsibility over this function.

The system automatically generates the export format, EDI, XML and CSV, when user client selects the export button. The user controls the generation of the export files.

The work flow/design of preferred embodiments utilizes a simple administrative dashboard that allows a user to utilize simple clicks of links or buttons and load changes to data.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

Figure 18:
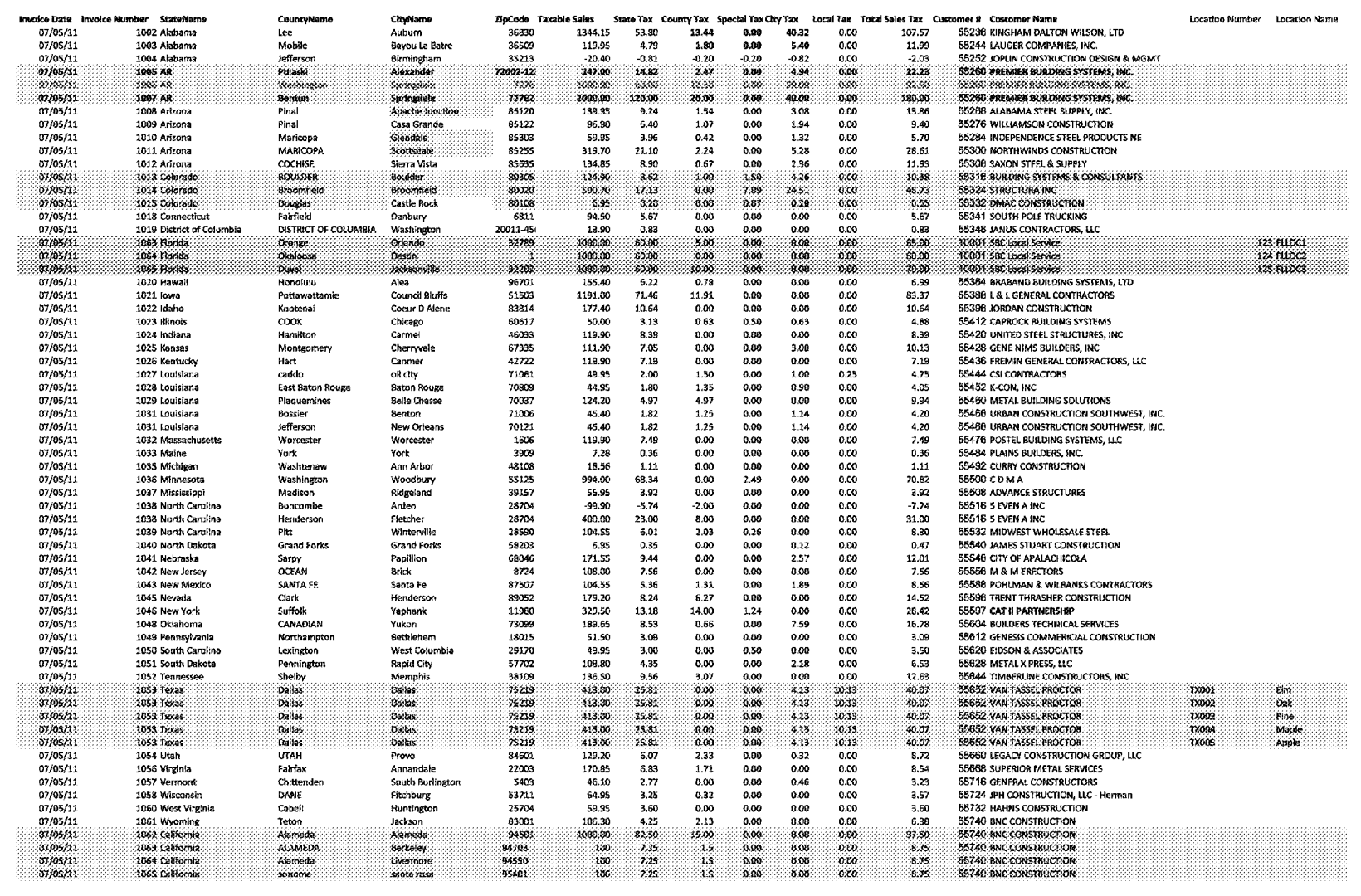

FIG. 18 shows a printout of an Excel data file that is used in connection with a system of a preferred embodiment of the instant invention.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1 through 18, an embodiment of the systems and methods of the instant inventive concept is shown and described. In the embodiment shown, the system of the instant invention is a web/cloud-based computer program or service, or other third-party hosted service, that is associated with one or more databases. Although described generally herein as a single database containing multiple fields and records, it will be appreciated that multiple separate databases are also intended within the broad definition of the term database, such that in some embodiments a "database" comprises separate databases for each record and/or separate databases for each field, which may be located at a single location or in other embodiments are located at multiple separate geographic locations. The computer program is a central or remote application that is operated by a third party that is independent of system users.

A system user contacts the service provider to sign up for the service and receives a user name and password, which are stored in one or more databases that are accessible by the computer program to verify a user and allow access to the system. The user then accesses the system via a website portal, enters username and password (FIG. 1) and the computer program compares the username and password to user information stored in the database(s) accessible by the computer program. If the username and password combination are valid, the computer program directs the user to a secure webpage dashboard (FIG. 2) that allows the user limited access to databases accessible through the computer program. Depending upon a user's access rights, which are defined by data stored in the database(s) and associated with the user's login information, the computer program will allow the user to view and edit information in several databases.

Figure 1:
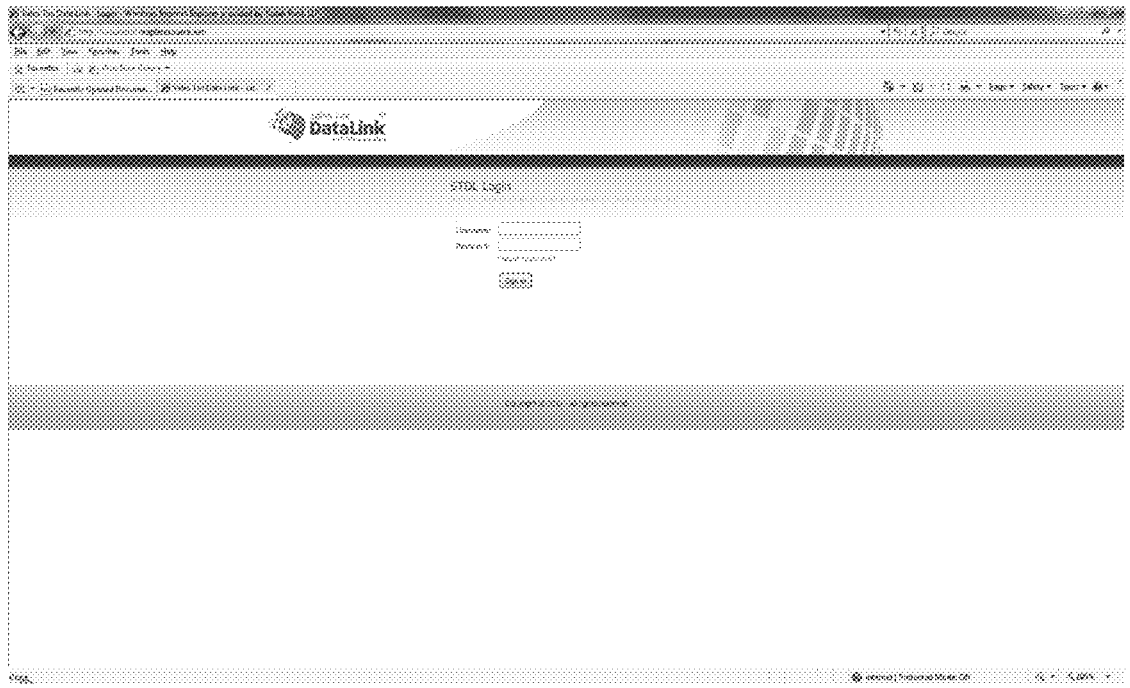
FIGS. 1 through 17 show various screenshots from a system of a preferred embodiment of the instant invention
Figure 2:
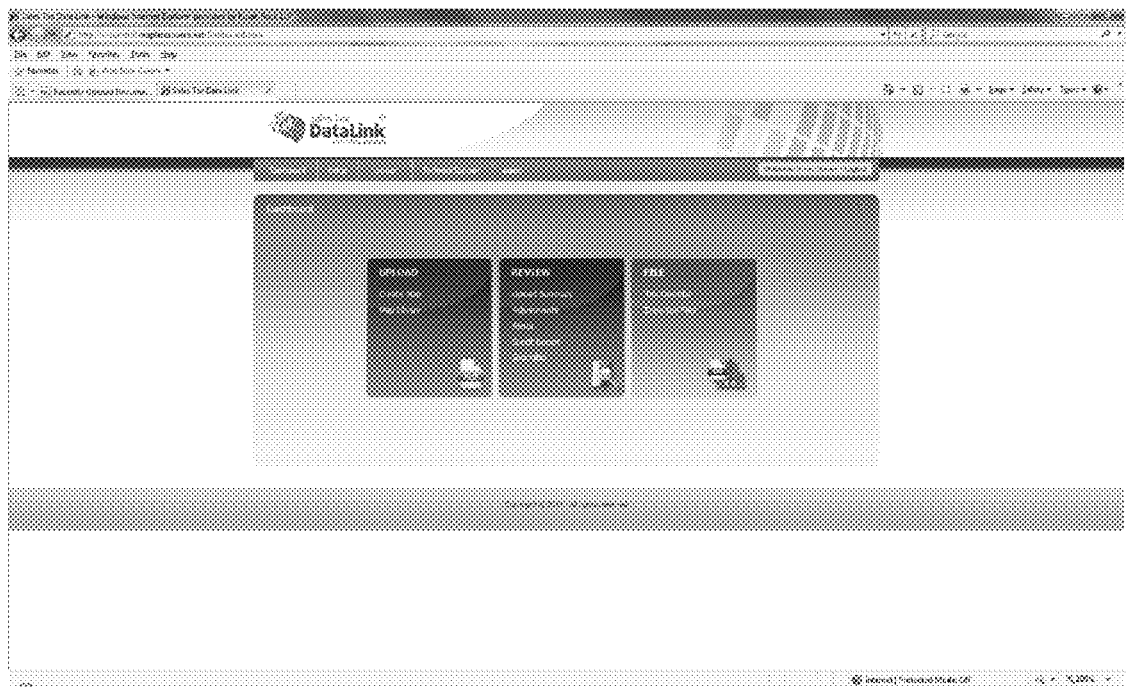
Figure 3:
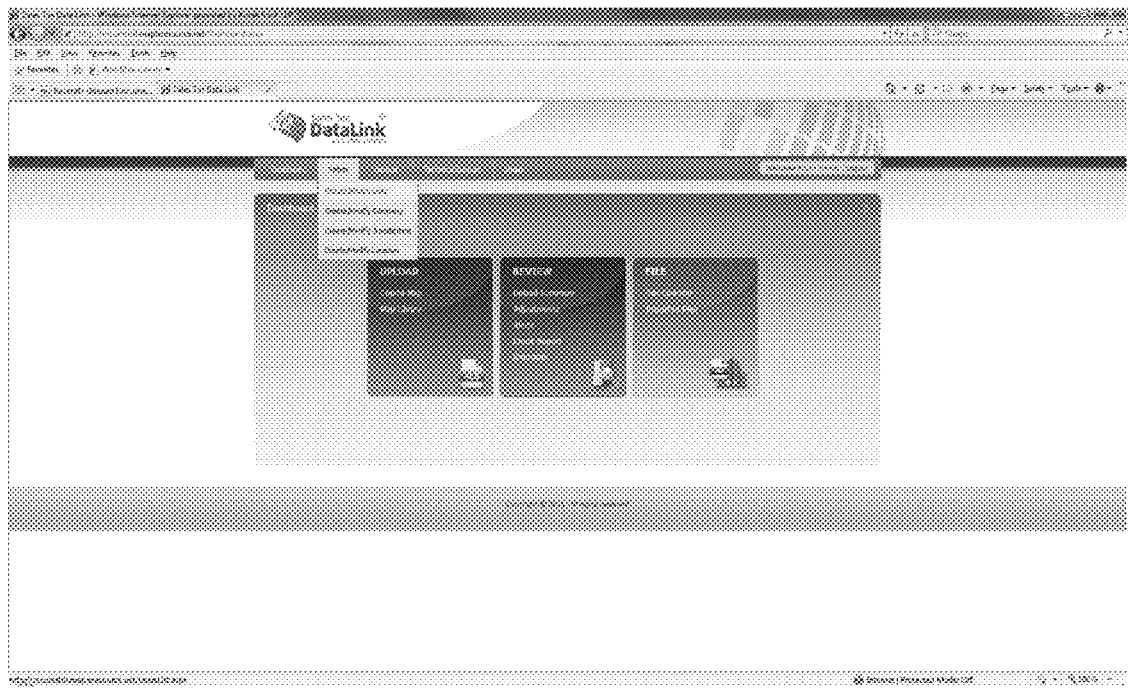
Figure 4A:
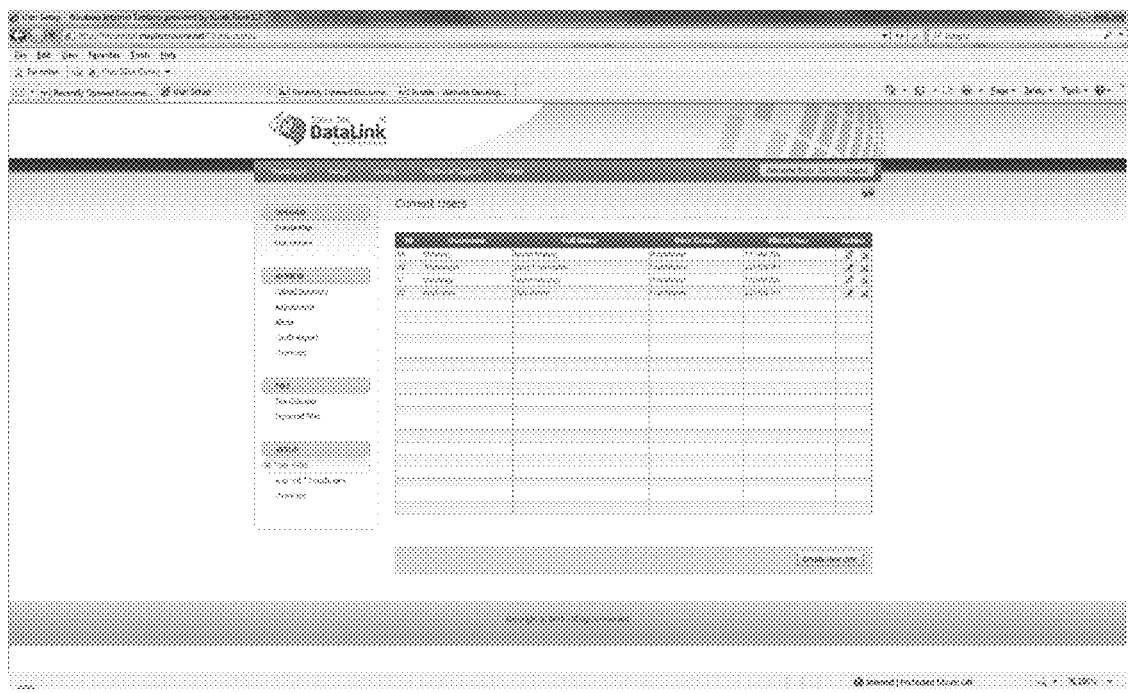
Figure 4B:
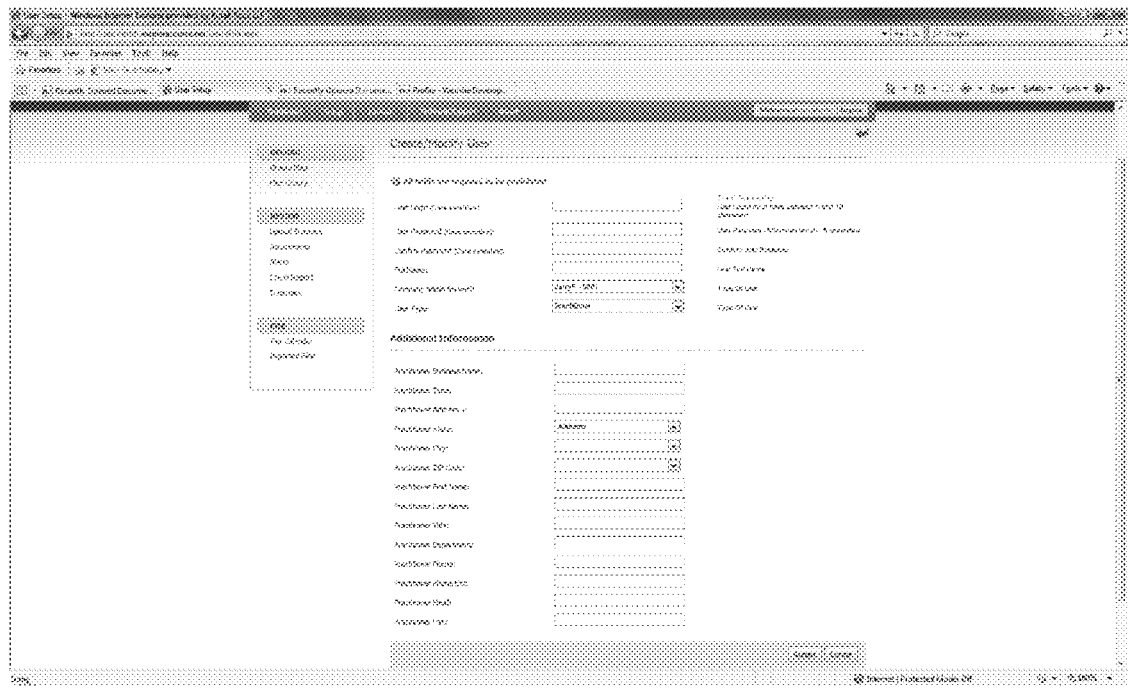
Figure 5A:
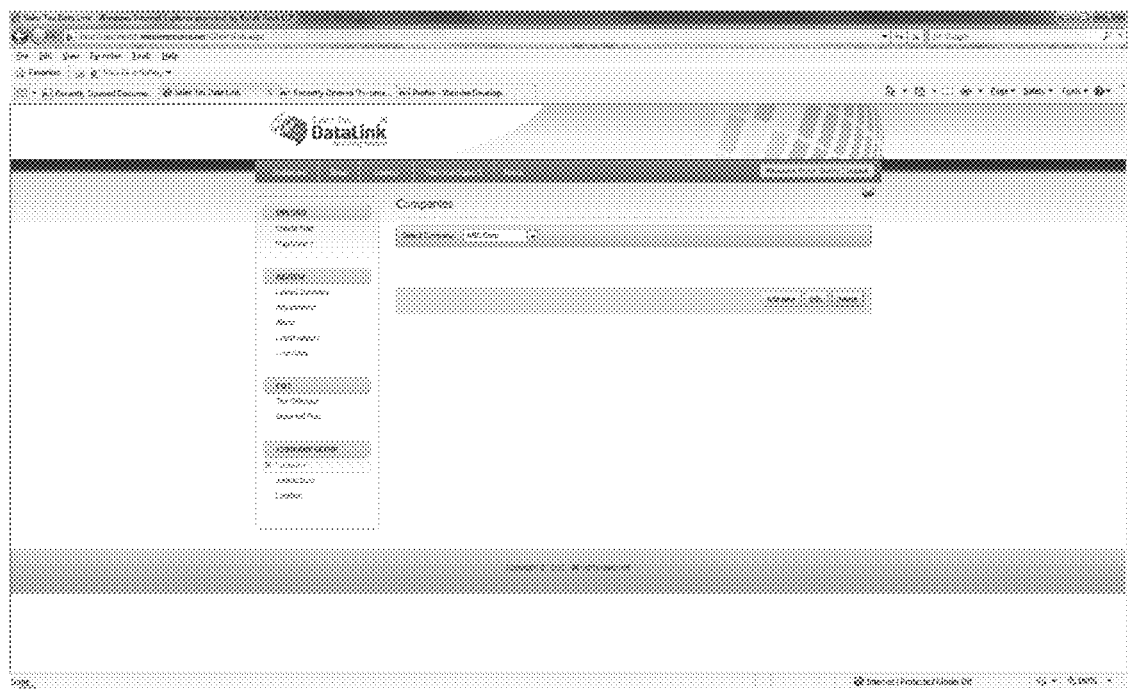
Figure 5B:
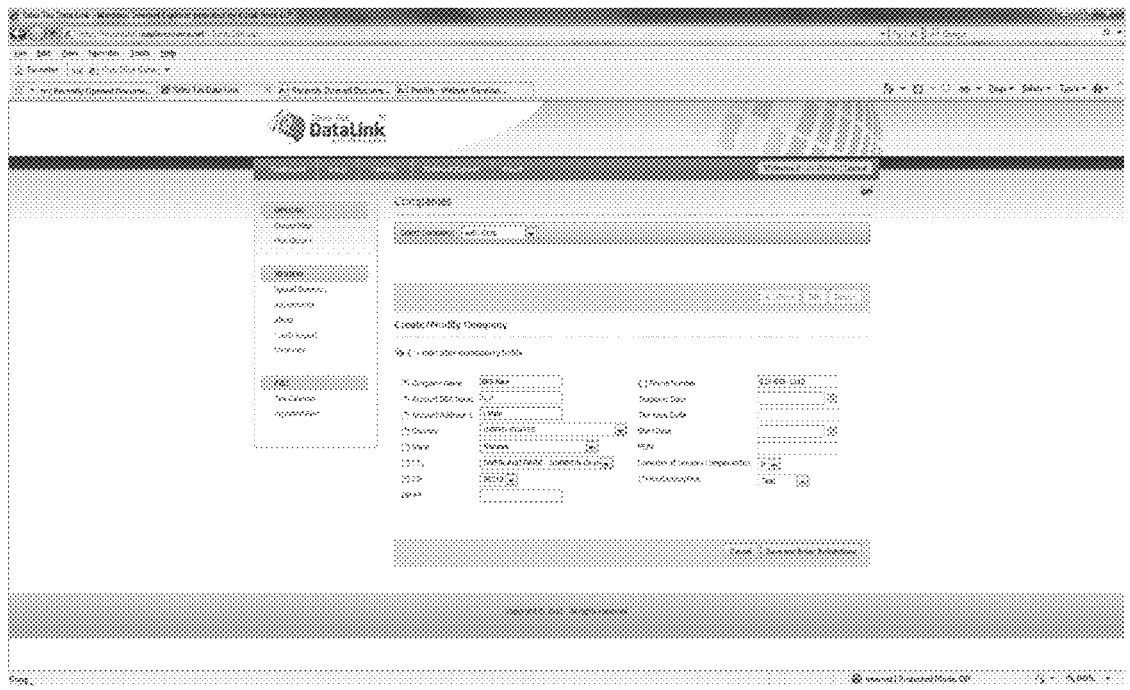
Figure 6A:
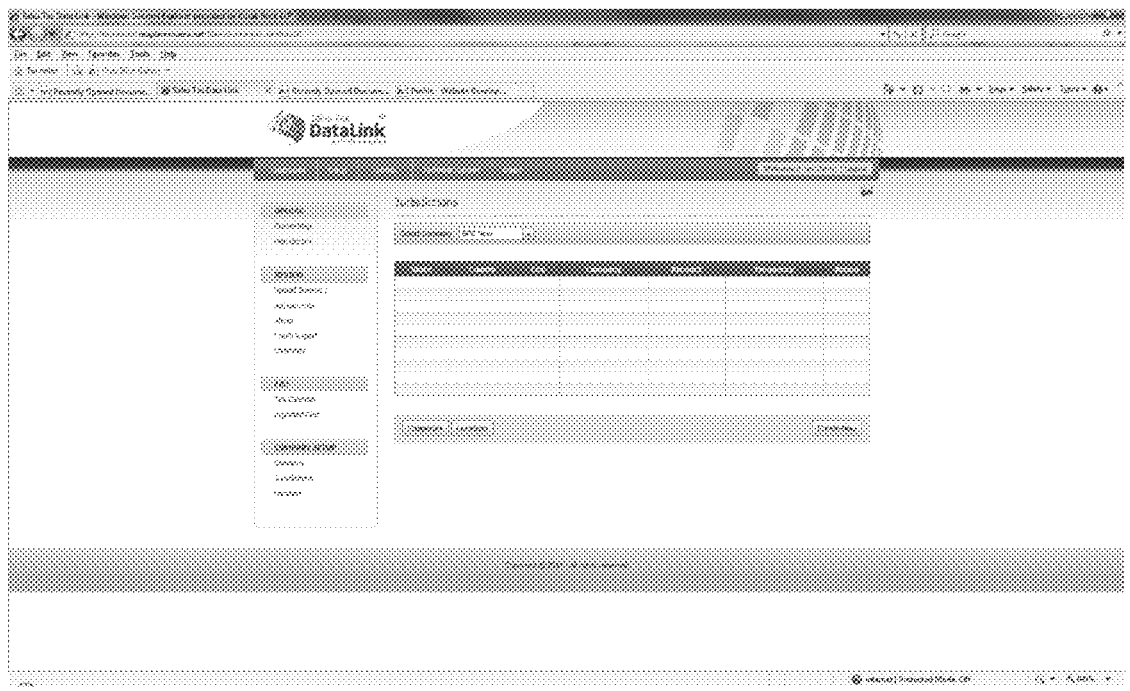
Figure 6B:
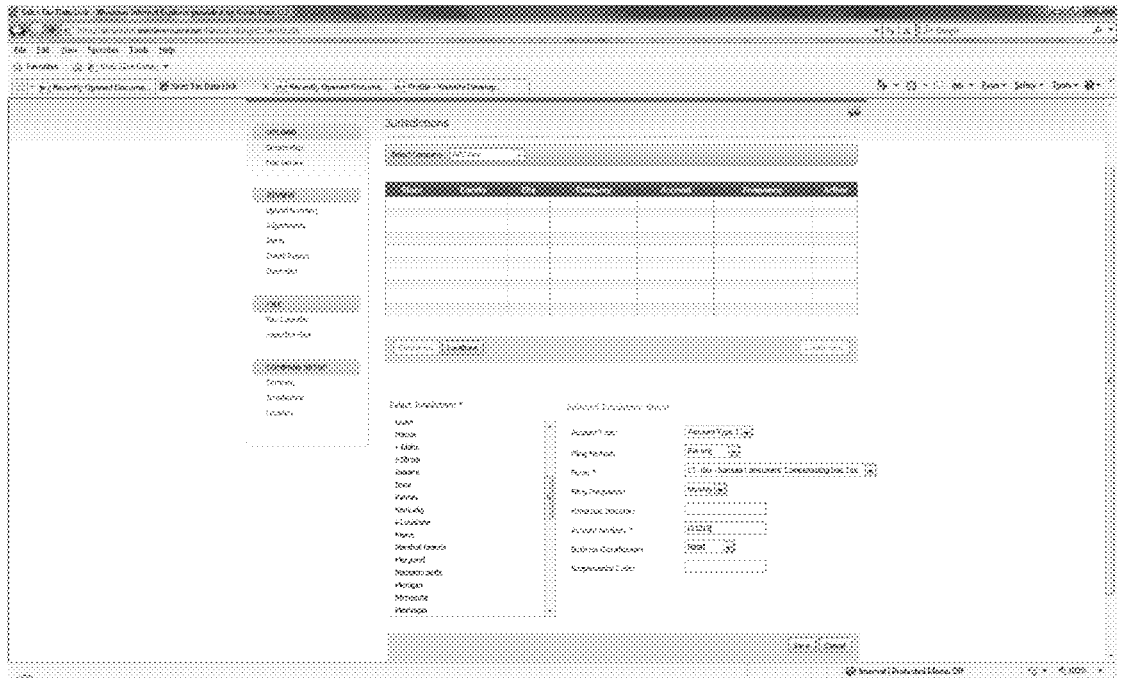
Figure 6C:
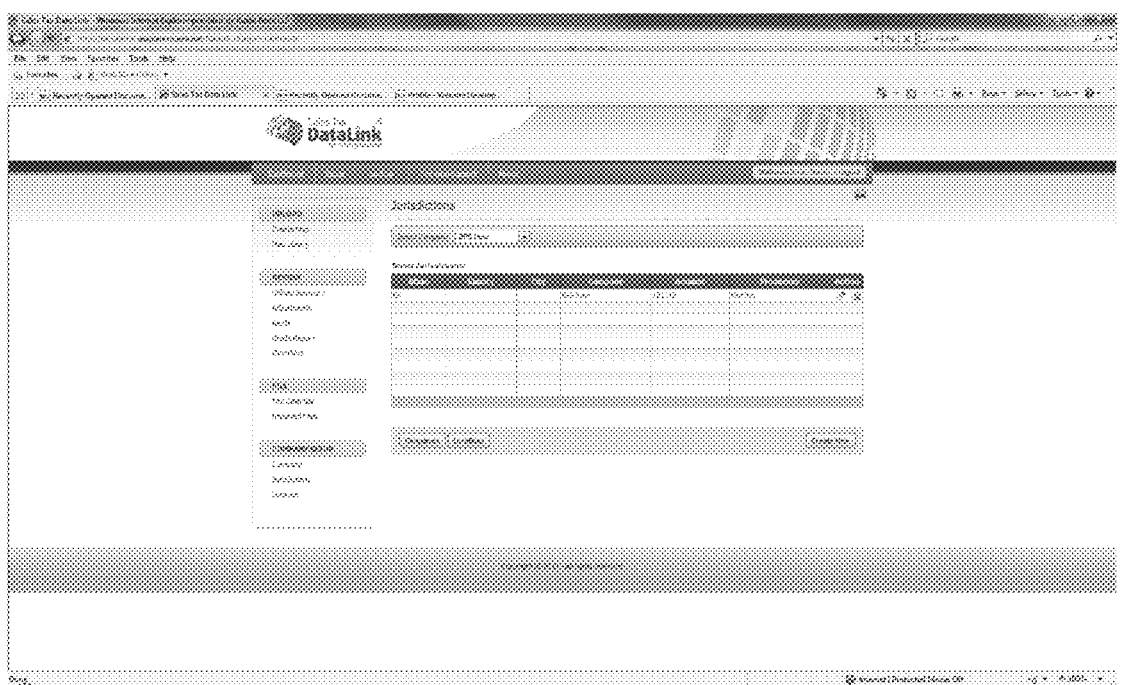
Figure 6D:
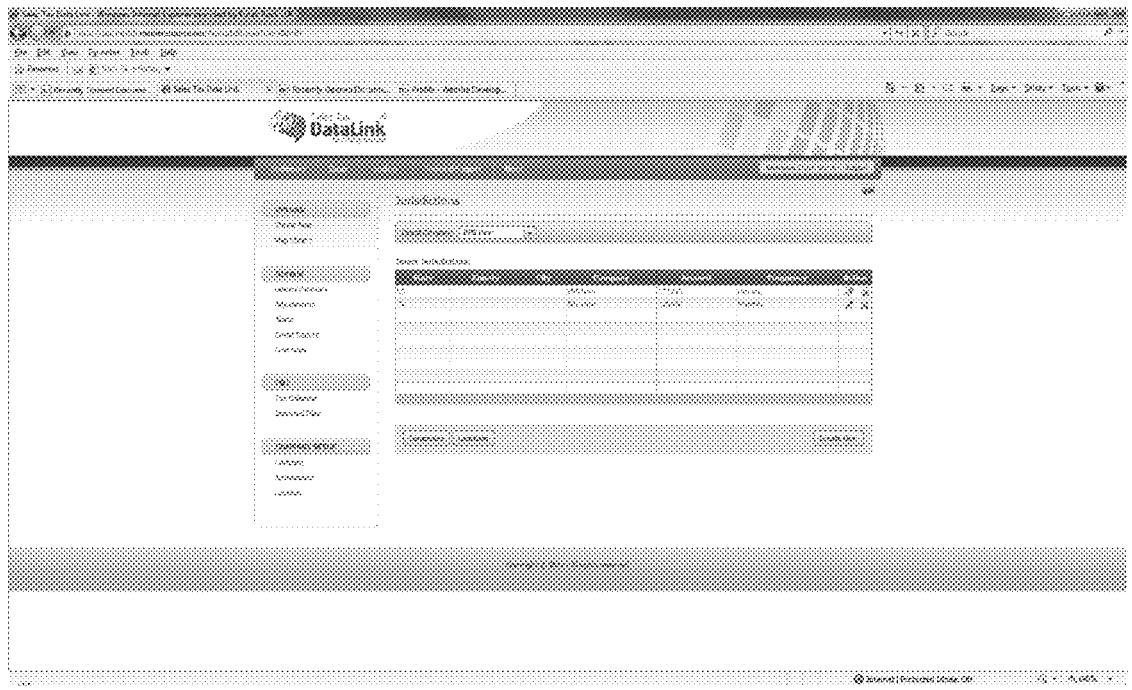
Figure 7A:
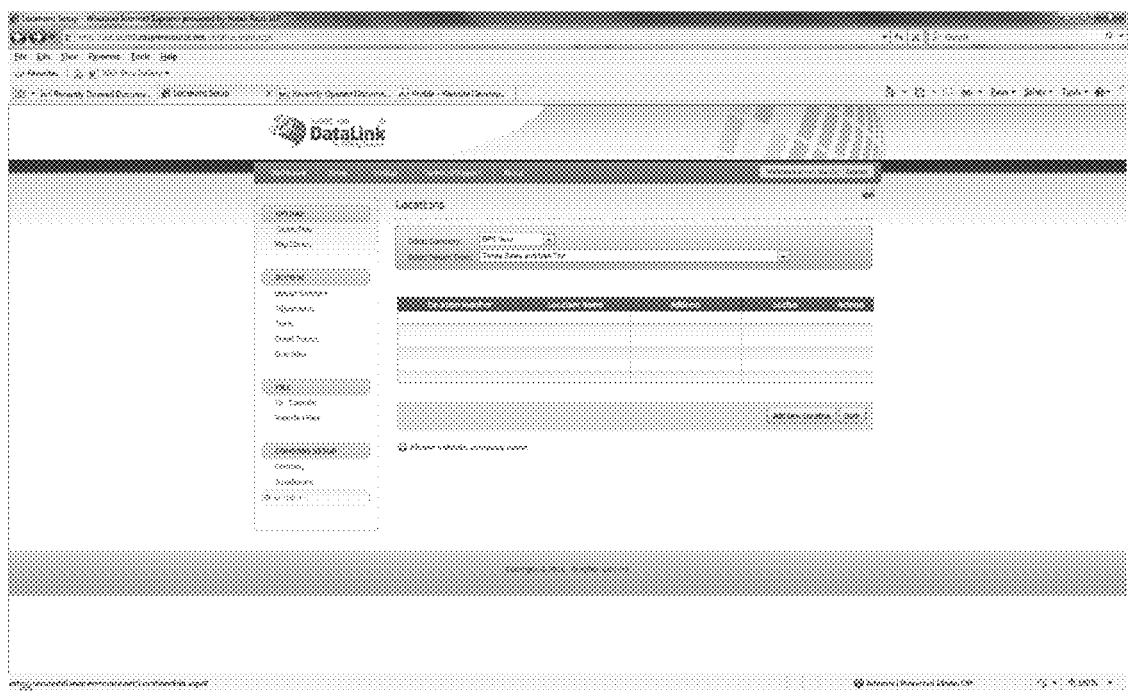
Figure 7B:
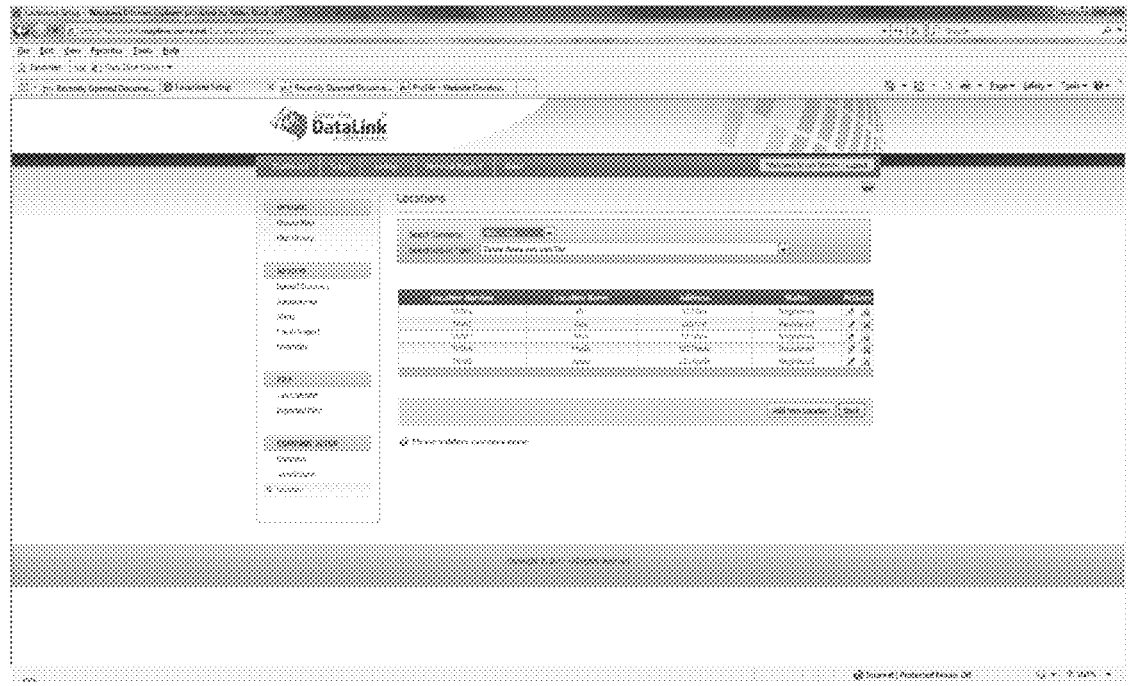
Figure 7C:
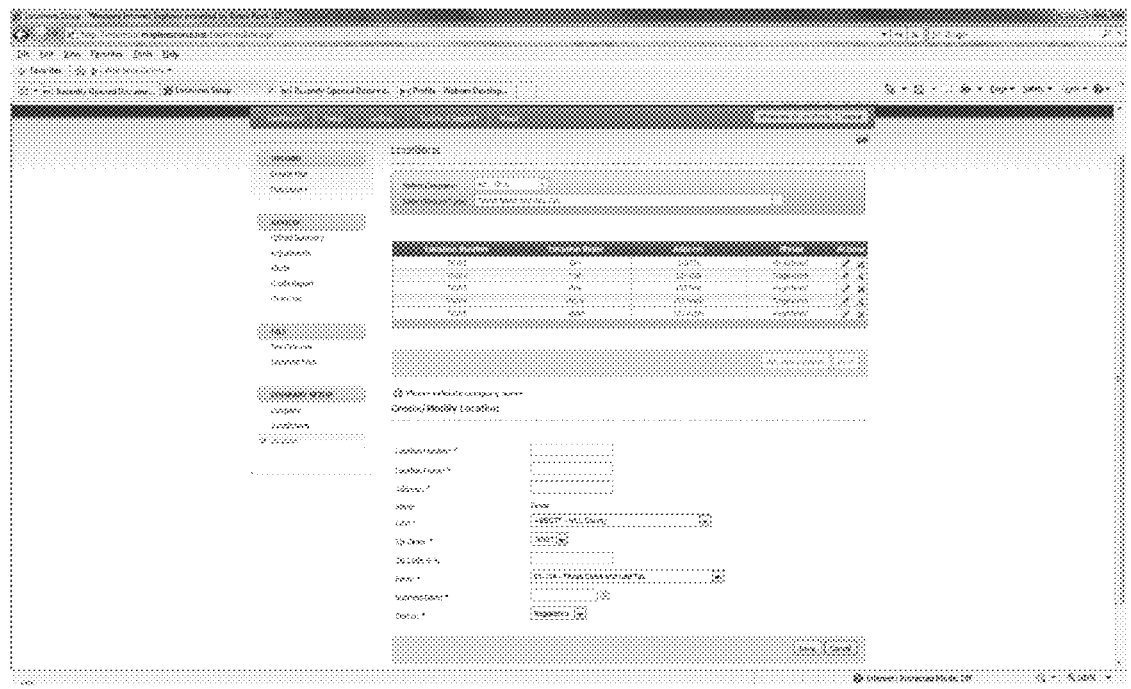

Referring to FIG. 3, depending upon a user's access rights, a user may use the computer program of the instant invention to: create/modify data stored in database(s) accessible by the user via the computer program regarding the user and other added user's of the system (FIGS. 4a and 4b); create/modify data in database(s) accessible by the user via the computer program regarding company's for which a user will utilize the system with respect to data preparation, review, e-filing, etc. of s taxes (FIGS. 5a and 5b); create/modify data in database(s) accessible by the user via the computer program regarding jurisdictions that are associated with each company (FIGS. 6a, 6b, 6c and 6d); and create/modify data in database(s) accessible by the user via the computer program regarding physical locations of each company within a particular jurisdiction (FIGS. 7a, 7b and 7c).

Figure 8A:
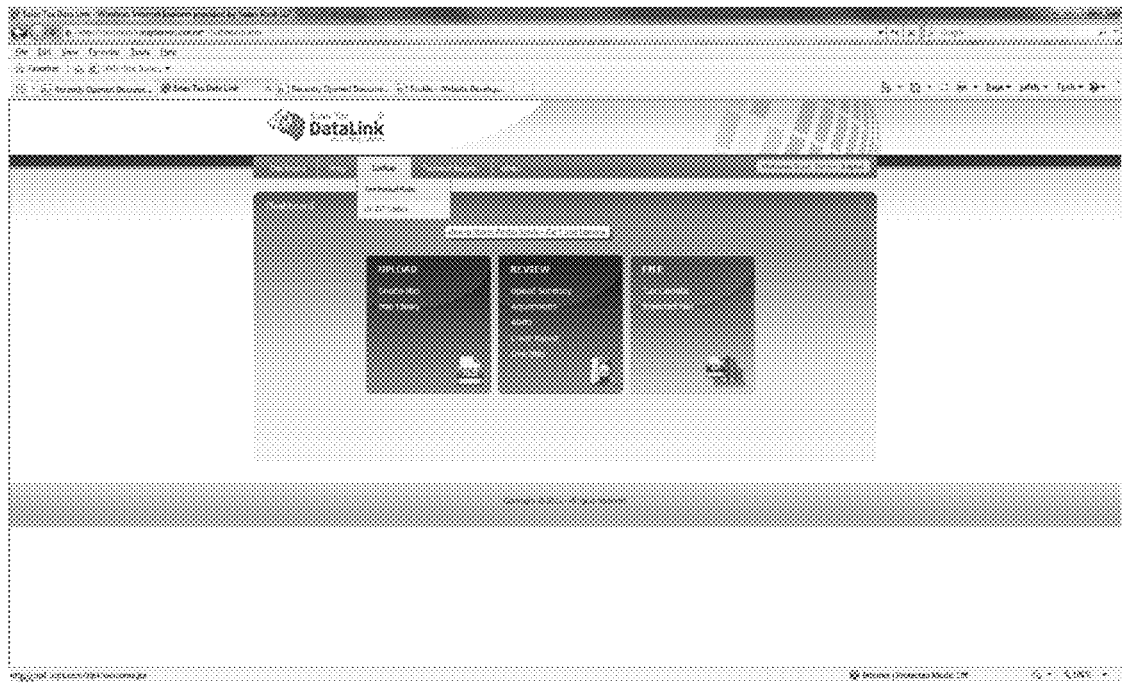
Figure 8B:
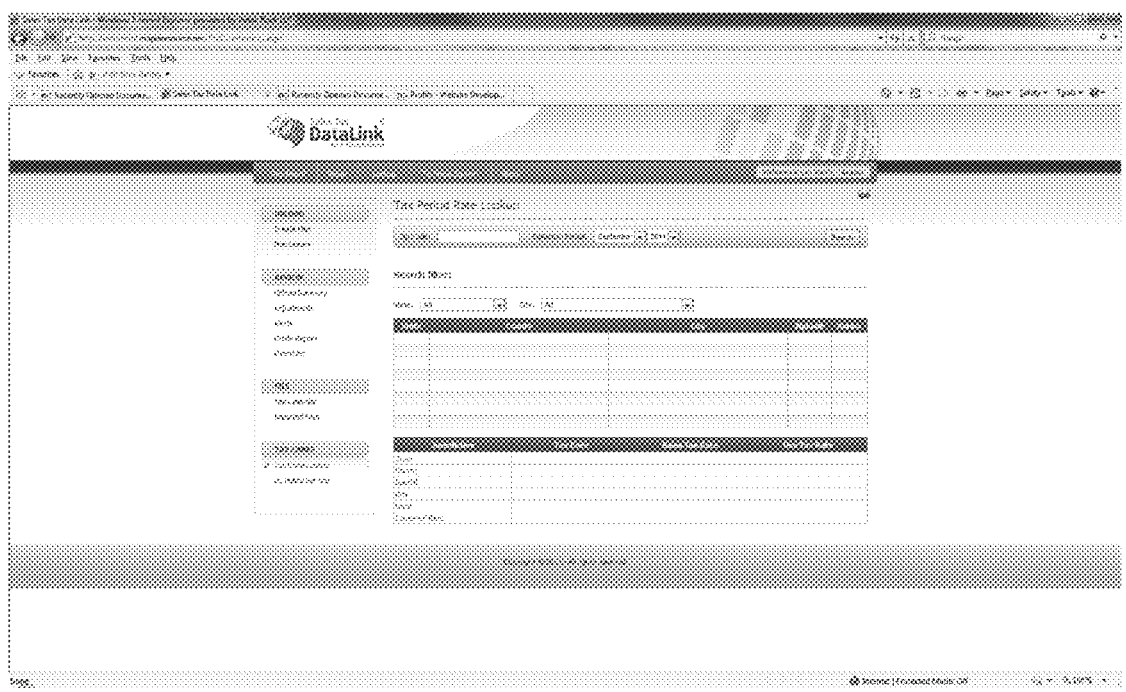
Figure 8C:
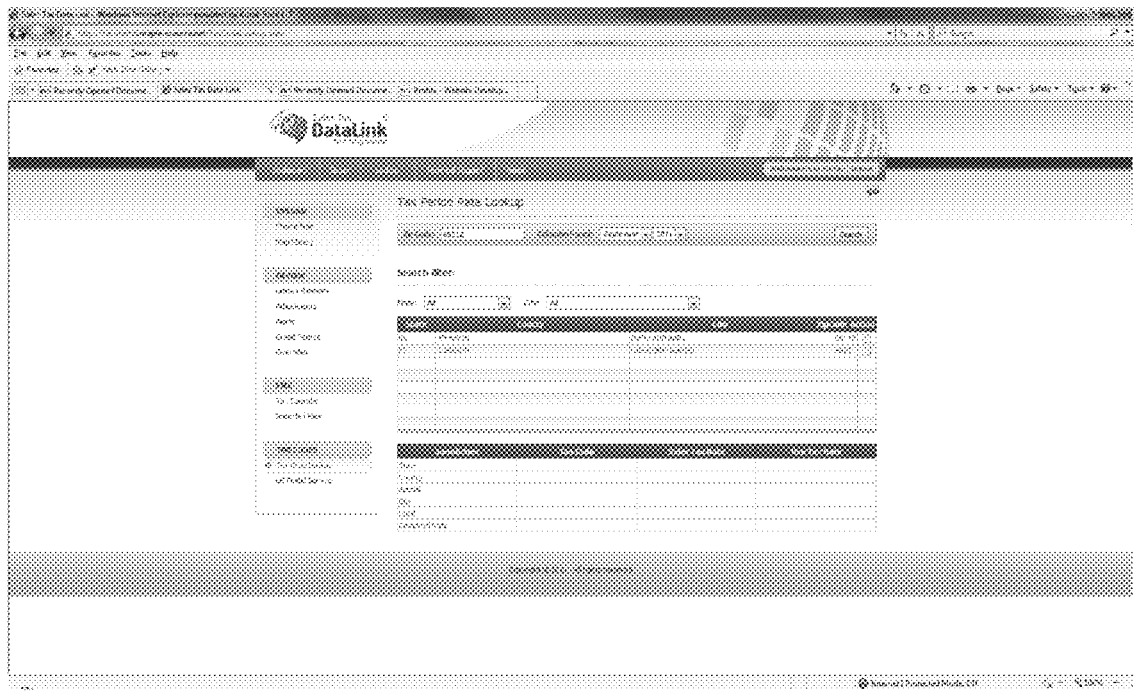
Figure 8D:
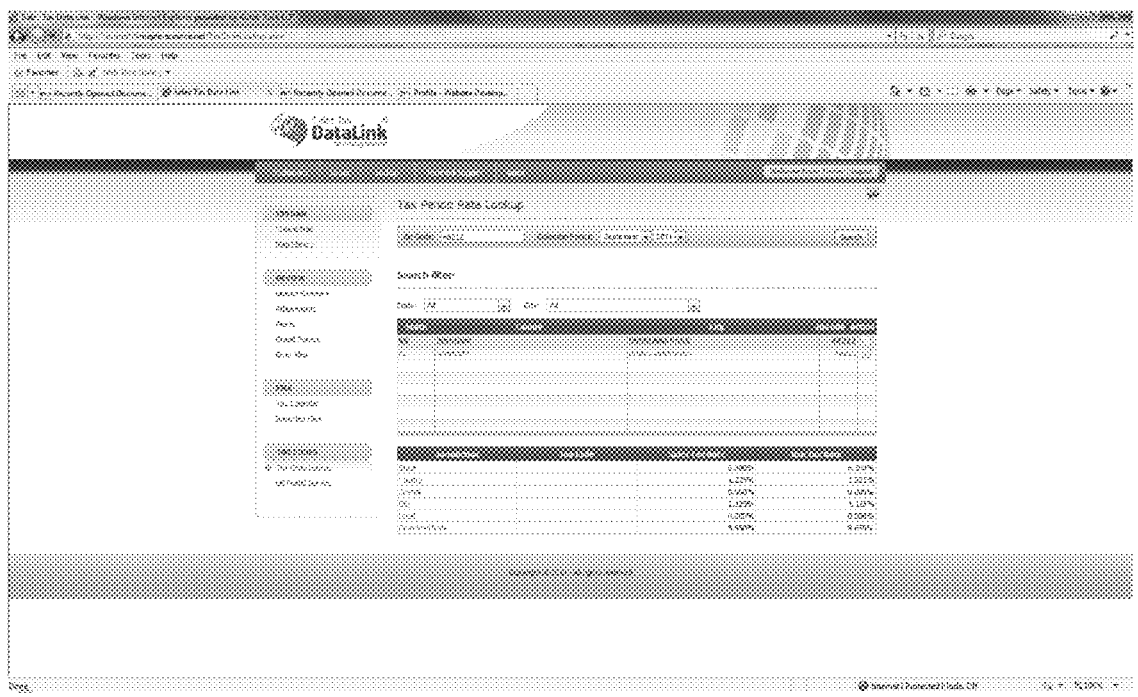
Figure 8E:
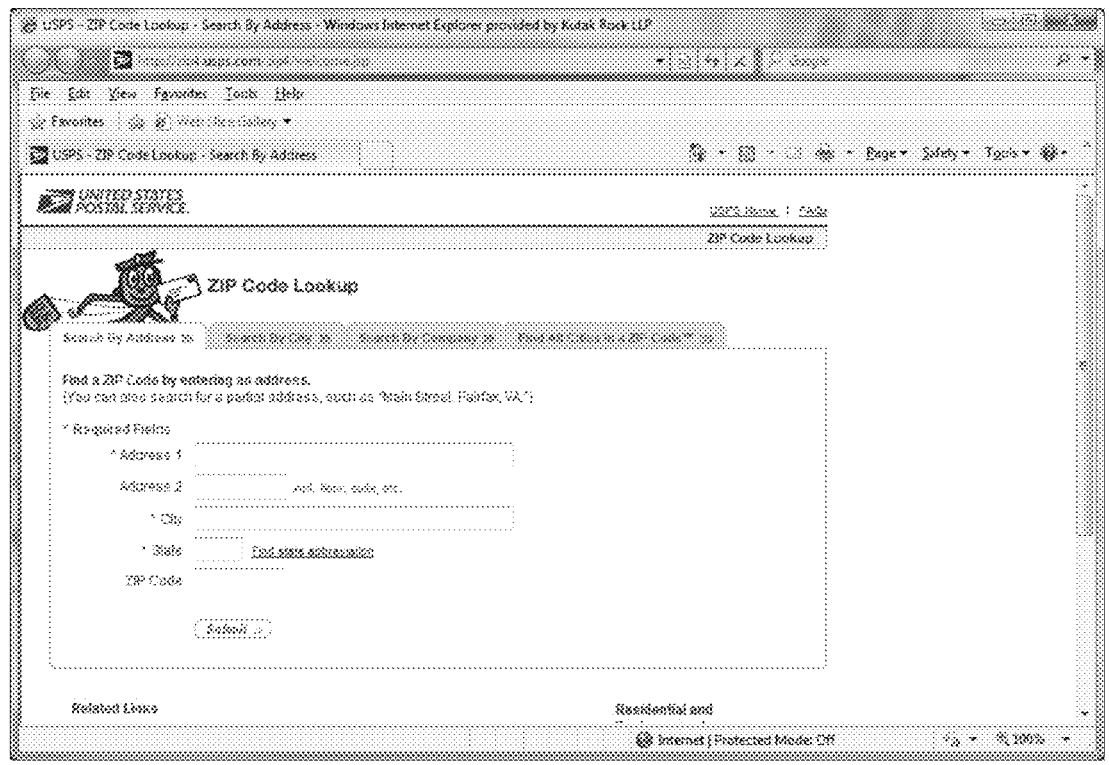
Figure 9A:
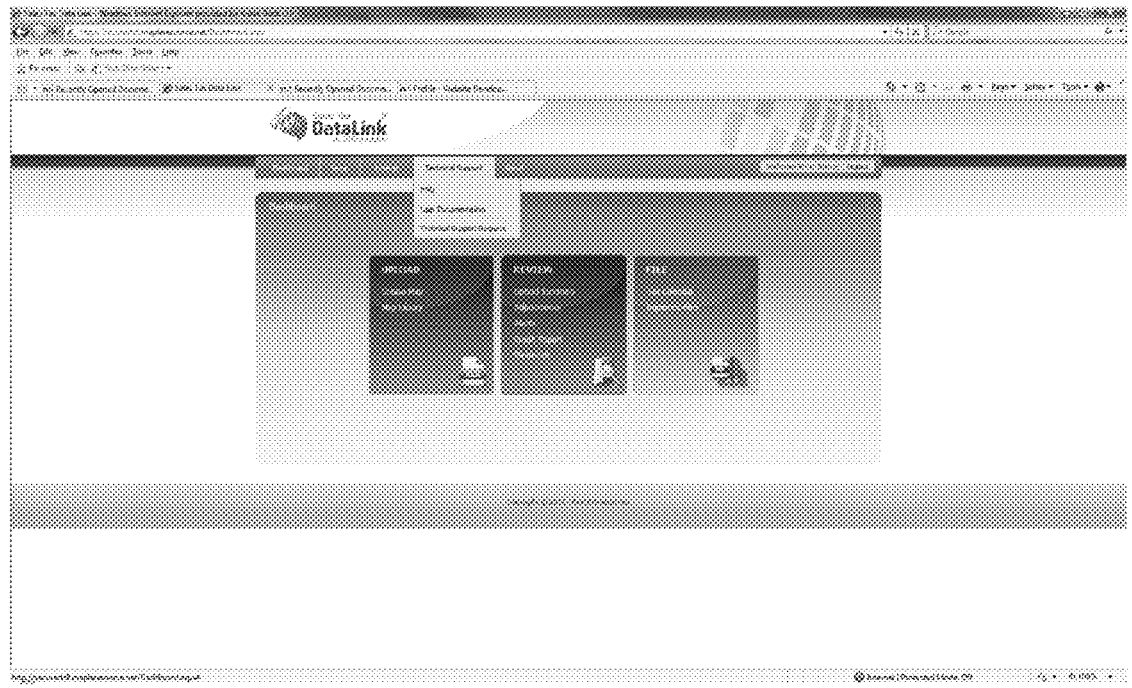

Referring to FIGS. 8a through 8d, a user also may access information stored in database(s) accessible by the computer program regarding tax rates for a particular jurisdiction during a particular time period. Referring to FIG. 8e, the computer program will link the user to the USPS website to look up information regarding a ZIP code for a particular address, in the event address information appears to be incorrect in the data from the user. The computer program further allows a user to access various types of data for technical support (FIG. 9a) and data about the system (FIG. 9b), which is stored in one or more databases accessible by the computer program.

Figure 10B:
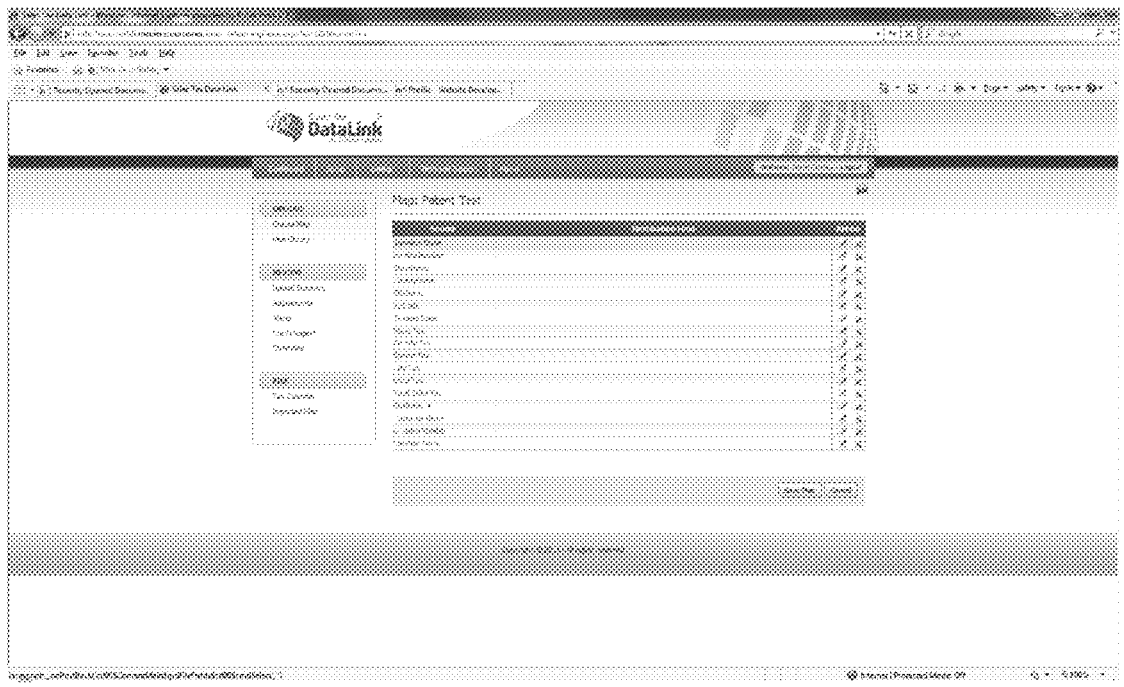
Figure 10C:
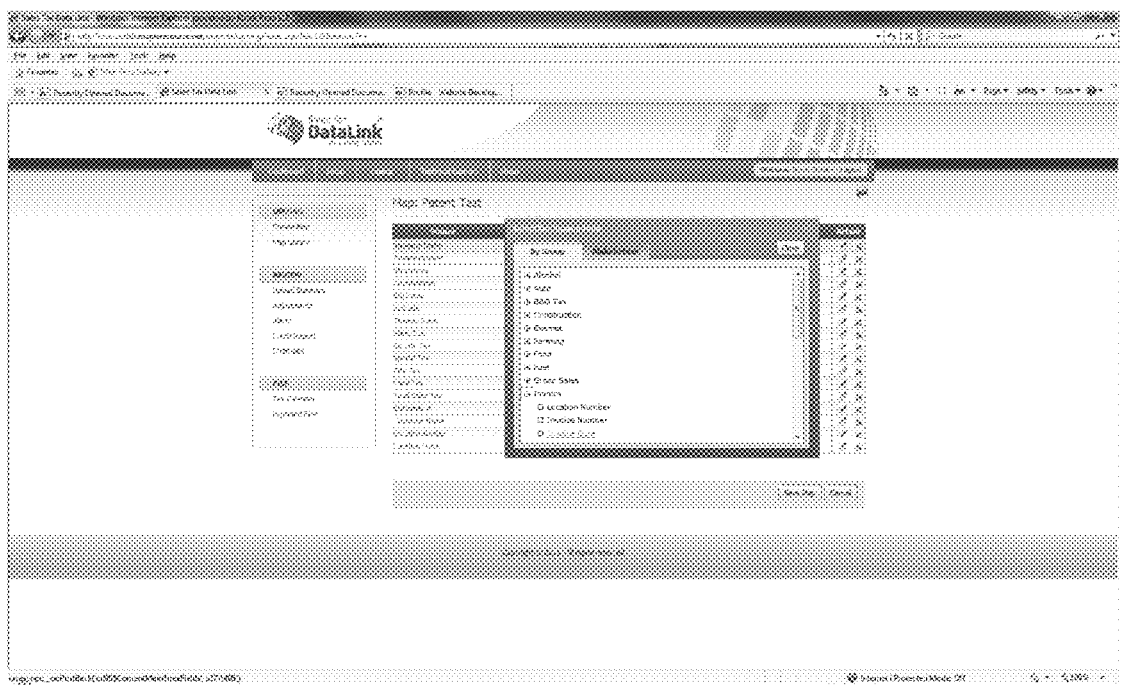
Figure 10D:
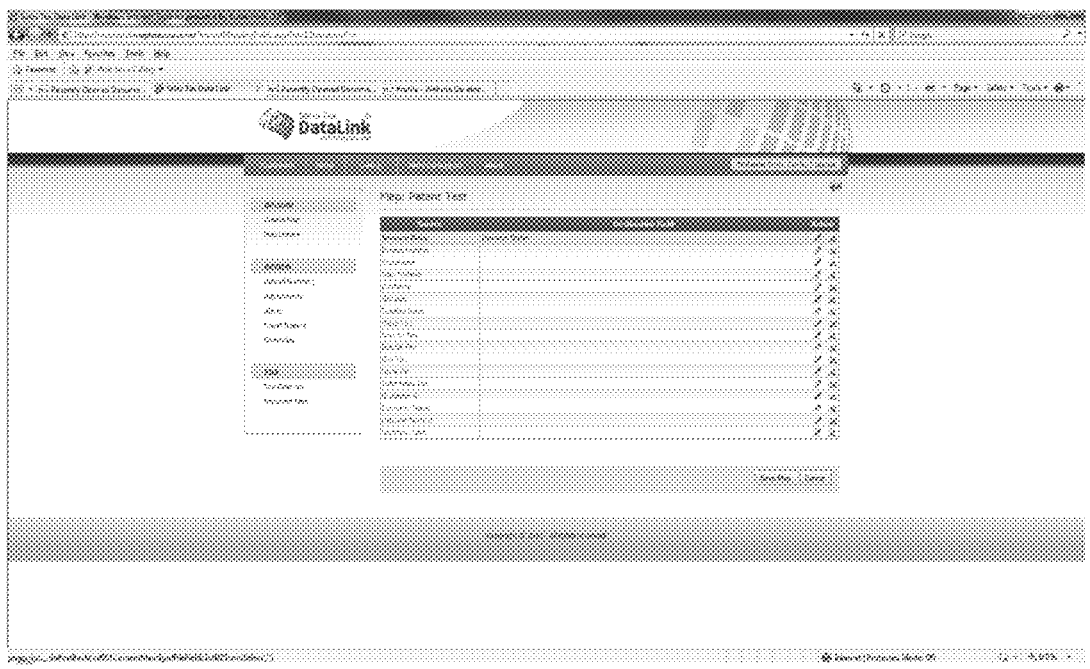
Figure 10E:
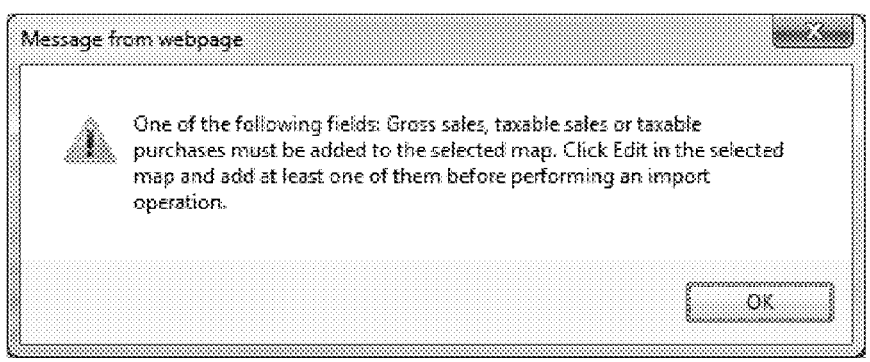
Figure 10F:
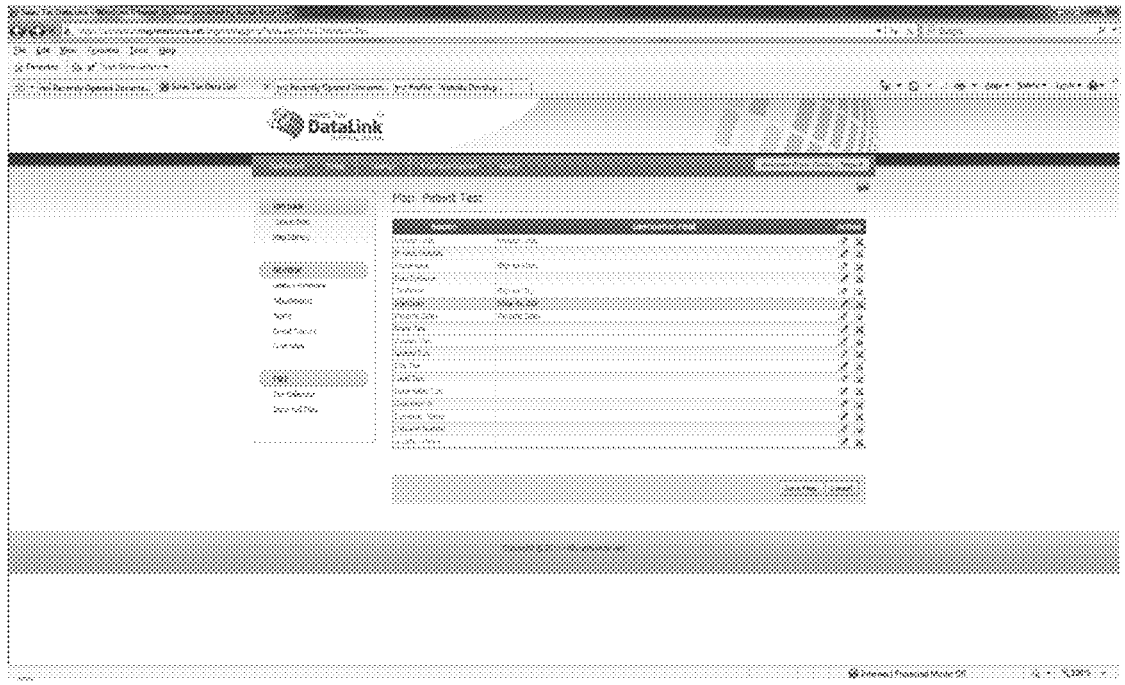

Once a user has populated the appropriate database(s) with information regarding users, companies, company jurisdictions and physical locations, the user is ready to initiate the processing of data by the inventive system. First, the user selects the Create Map option from the dashboard and selects a data file (such as the Excel spreadsheet file shown in FIG. 18 that is generated from the user's tax calculation engine system) for upload into a mapping database of the system that is accessible by the computer program (FIG. 10a). Once the file is uploaded, the computer program populates a database with data column labels that the computer program obtains from the columns in the data file and displays to the user a source list (FIG. 10b). The computer program then allows the user to select destination fields for each source field that the user desires to map to the system of the instant invention (FIGS. 10c and 10d). The computer program will display an error message if the user fails to map key data fields necessary for use of the system to process sales tax data from a data file (FIG. 10e). Once the minimum data fields are populated, the computer program stores the map in a database(s) accessible by the computer program (FIG. 10f). The finished map basically tells the computer program what the data is in each column of the data file that is being uploaded, and where in the database that keeps sales tax data for each company, that data is supposed to be stored for use by the computer program in processing the data. If a particular column is not mapped from the source file, when the file is uploaded into the database(s) of the inventive system, the data from those columns is not uploaded and/or stored in the database(s) of the instant system. Only data from mapped columns is stored.

Figure 11:
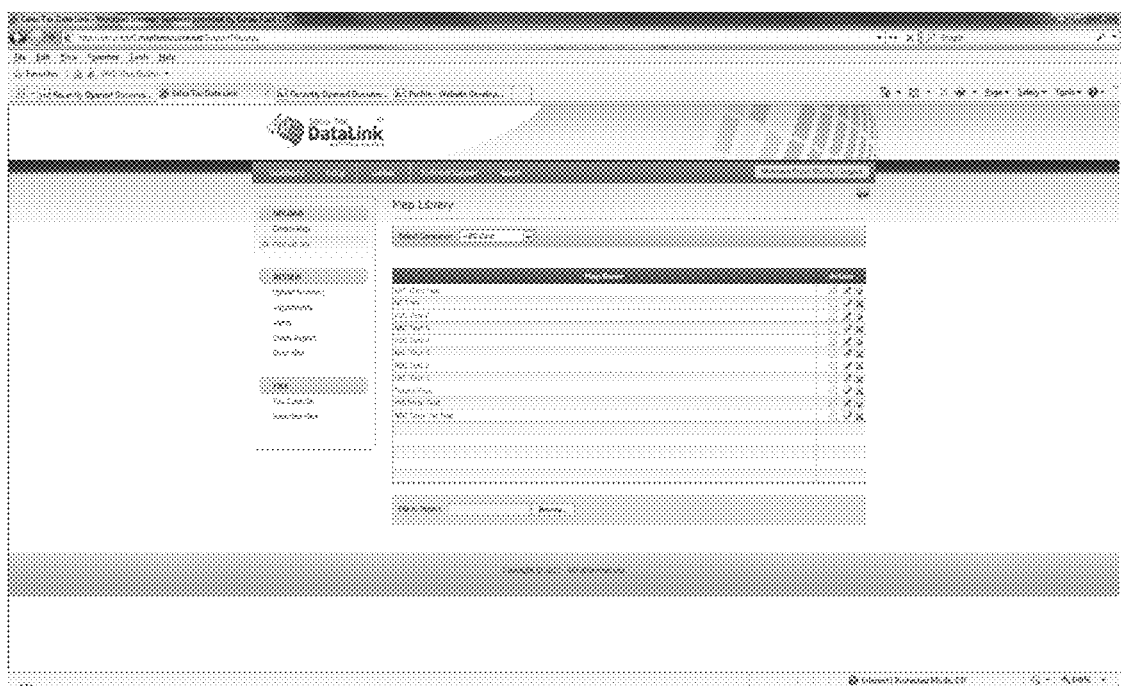
Figure 12:
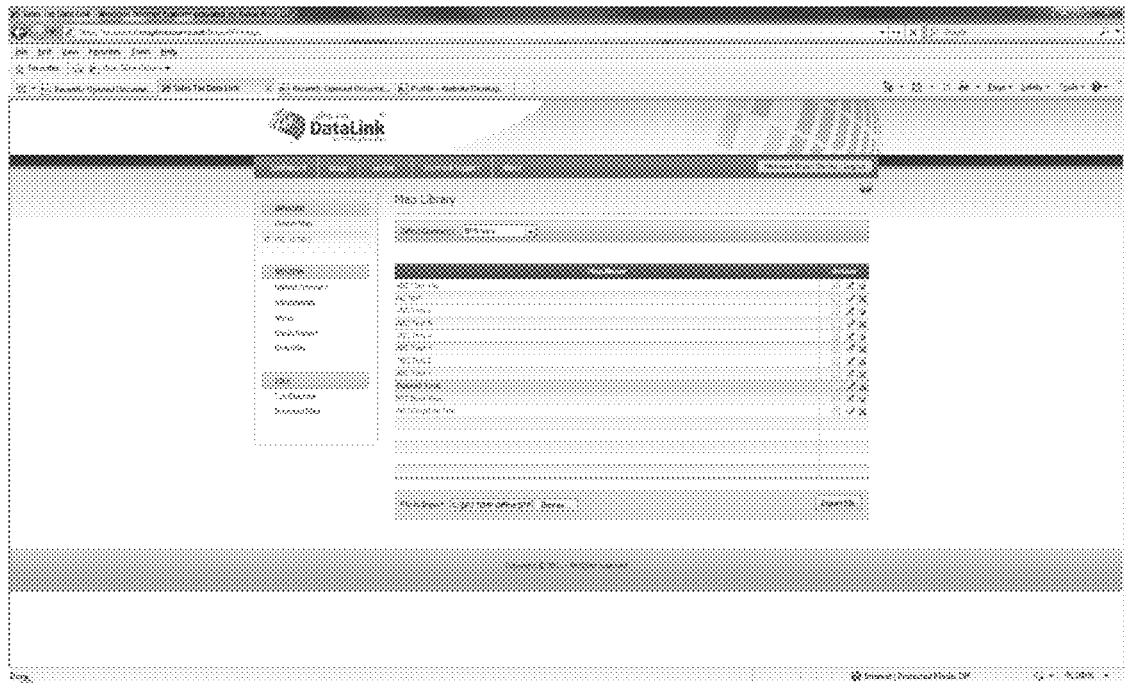
Figure 13:
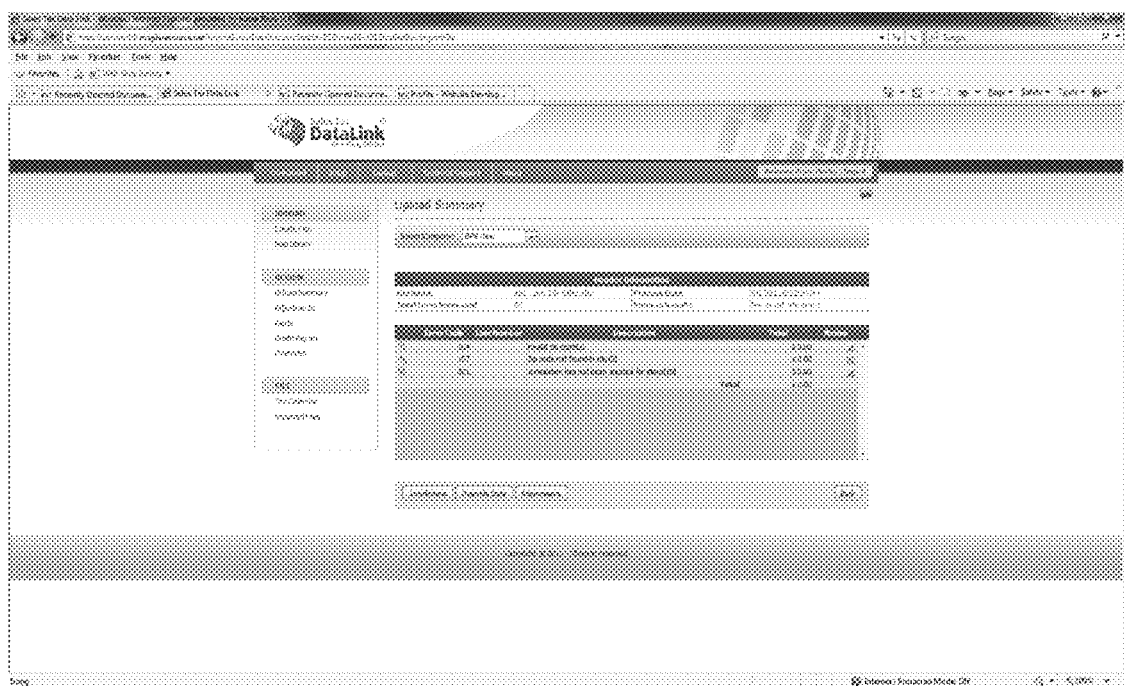

Once a data source file has been mapped, the user can utilize the map to upload data from the data file (or another data file having the same format as the originally mapped file) into the system database(s). The user does this through the map library (FIG. 11). The user selects the company for which the sales tax data applies from a dropdown on the map library page, selects the map that is desired (i.e. the map that was created by the user for the data file), and selects the data file to import (FIG. 12).

Once the data file is imported/uploaded into the database(s) of the instant system, an upload summary is generated (FIG. 13) after the system imports and processes the data. In processing the data, the computer program checks the data for various errors (such as invalid address information, or tax collected for jurisdictions that have not been associated with the particular company in the databases of the instant system), and validates (using tax percentage information associated with each jurisdiction, which is stored in a database accessible by the compute program, and sales data from the data file) the total amount of tax that is due in each jurisdiction. The computer program also notifies the user if the total tax due in a jurisdiction differs from that which was collected and stored in the data file. The computer program alerts users and allows the user to take action to correct errors and/or instruct the program what action to take with respect to the error, and the computer program stores the instructed action in a database to allow the computer program to take the appropriate action when filing in the impacted jurisdiction. The computer program allows a user to make adjustments and overrides to correct errors from the data in the data file, which may be recurring in subsequent data files. Overrides can be globally stored in a database, so the computer program takes the appropriate action in the future when similar errors (or situations that are not errors) occur in future uploads. In addition, the computer program stores in its databases information regarding credits the company may have in certain jurisdictions and identifies and alerts the user if credits are available and can be applied within the jurisdiction or to other jurisdictions and allows the user to instruct the computer program to take appropriate action with respect to such credits. The computer program stores information regarding credits from a period that are not applied in that period are stored in the database(s) in association with the company and jurisdiction for application at a later date. Additional information regarding these tools is shown in the user manuals of Exhibit B attached to U.S. Provisional Patent Application Ser. No. 61/530,674, filed Sep. 2, 2011, and Exhibit B attached to U.S. Provisional Patent Application Ser. No. 61/696,421, filed Sep. 4, 2012, the entire disclosures of which are incorporated herein by reference.

Figure 14:
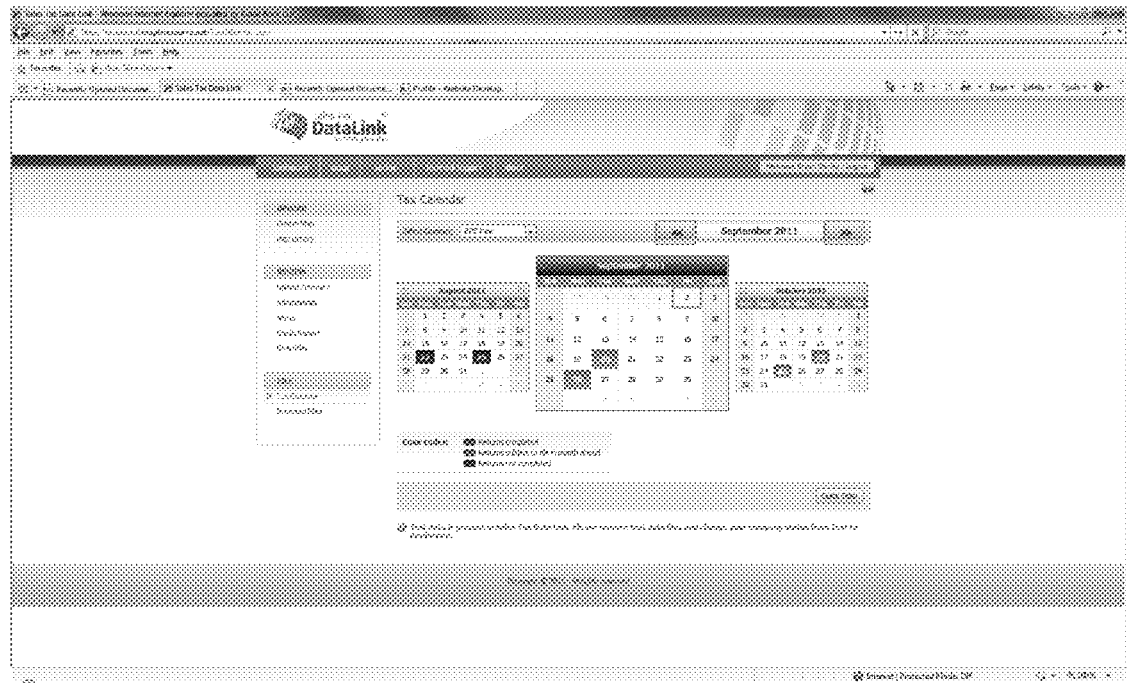
Figure 15:
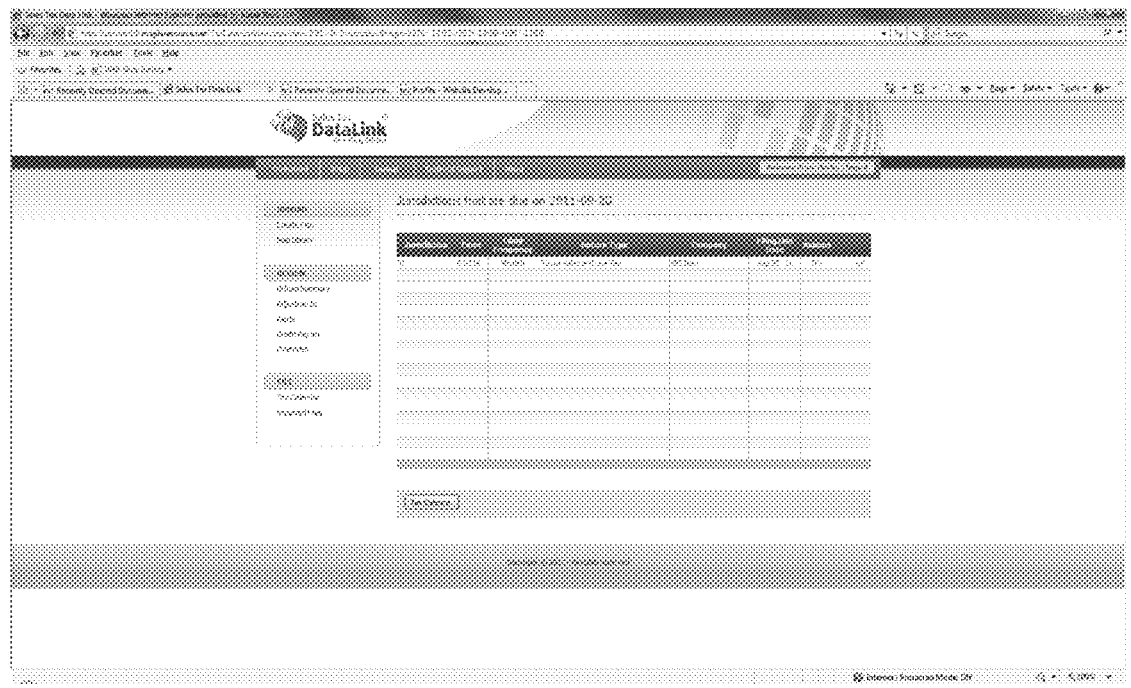
Figure 16:
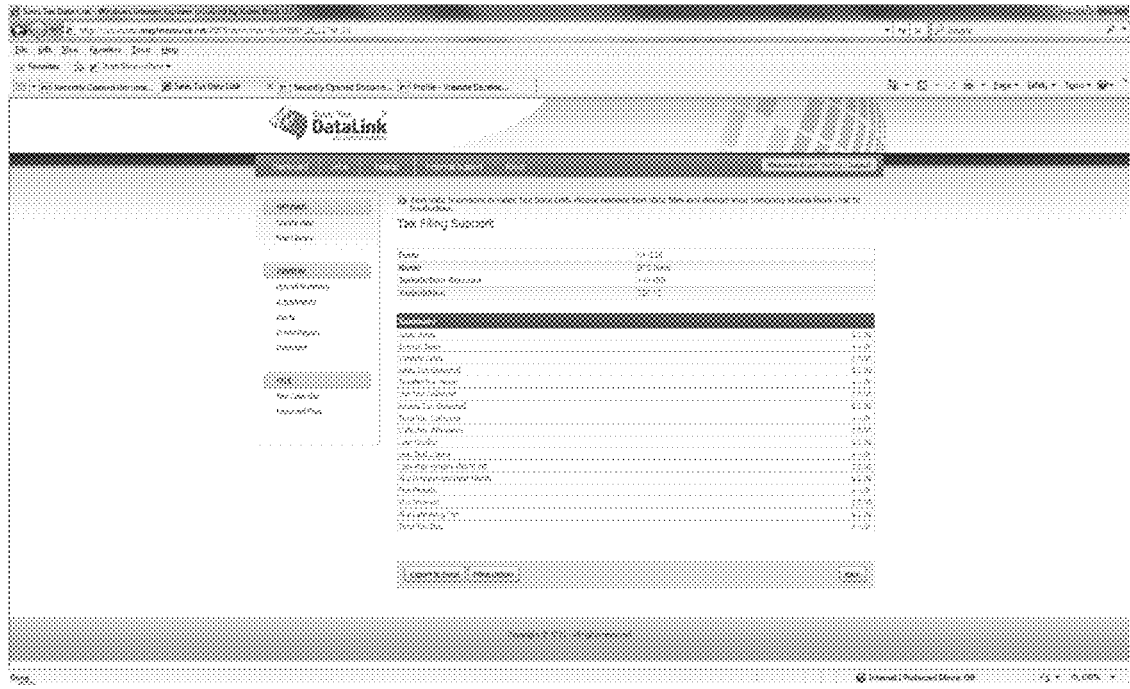
Figure 17:
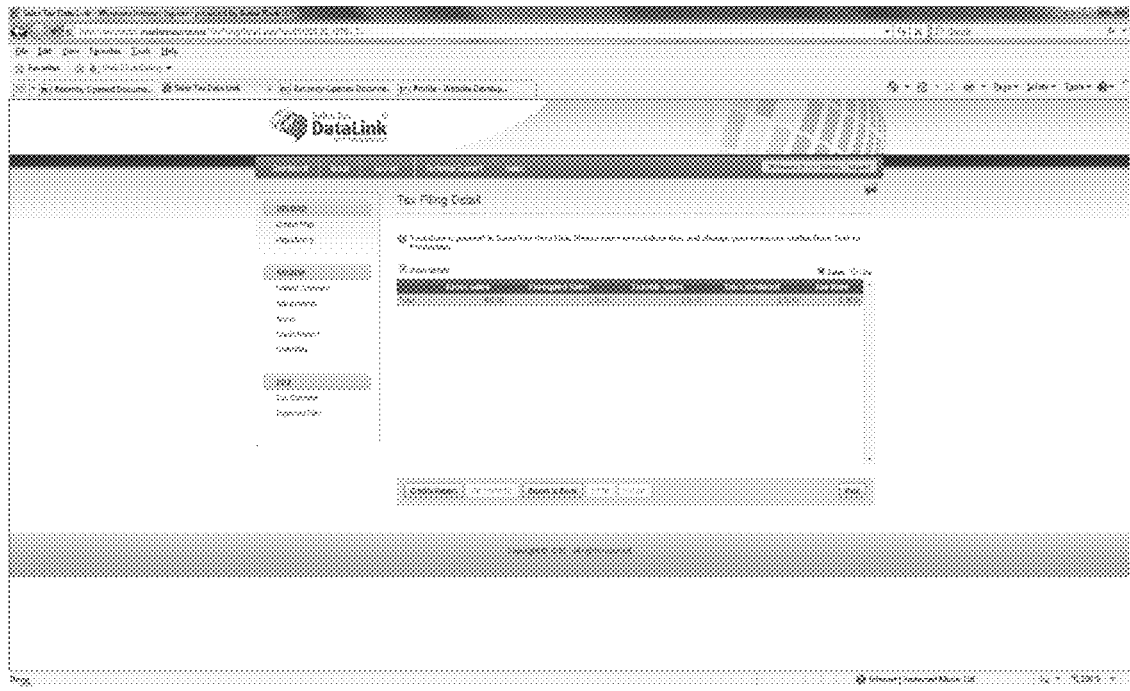

Once data from one or more data files is uploaded and processed by the inventive system, the user can view a graphical calendar that shows the user in a color coded manner dates in which actions with respect to sales tax filings have been made, are coming due, or are overdue (FIG. 14). The user can select a date and the computer program will display a list of jurisdictions in which filings are due (or overdue) on that date for the selected company (FIG. 15). The user can then drill down by selected TFS link to show the amounts due within a jurisdiction (FIG. 16), and then proceed to have the computer system format the data for filing electronically in the appropriate jurisdiction (if available), or export the data in another format (such as Excel). Once electronic filing is completed, the Computer program updates the database(s) accordingly such that the graphical calendar shows the filing as completed and no longer due, and records a confirmation number (if received) for the electronic filing in a database associated with the company and jurisdiction.

The instant invention automates many aspects of the data preparation, review and filing process. It allows multi-state businesses, including CPAs, to control the workflow themselves from a Back Office dashboard. An interlocking data file upload process manages tax data errors. The instant invention includes post-tax calculation overrides, credit maintenance and adjustment functionality. It identifies potential problems via instant Alert Notifications. Then the inventive system generates reports in a variety of formats with real time reconciliation and variance notification down to the local level, providing EDI, XML and CSV exports as a self-managed option.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of processing tax data for sales or purchase of goods or services, said method comprising the steps of:
uploading a data file containing information regarding taxes collected or paid for a plurality of transactions into a database accessible by a computer program;
processing said data file by said computer program;
displaying to a system user of said computer program information relevant to one or more records of said data file in said database after said processing step, the system user being a customer-type user of said computer program that utilizes said computer program for processing tax data provided by the system user;
allowing the system user to input an action to be taken with respect to said displayed information;
storing said inputted action in said database in association with said one or more records to which said displayed information is relevant;
utilizing said inputted action for further processing of said one or more records; and
displaying to the system user updated information relevant to said one or more records following said utilizing step;
wherein said inputted action applies a net credit taxes collected or paid for a particular transaction toward a future tax liability or to a like kind tax jurisdiction.

2. The method as claimed in claim 1 further comprising the steps of:
allowing the system user to input an other action to be taken with respect to said displayed updated information;
utilizing said inputted other action for further processing of said one or more records; and
displaying to the system user updated information relevant to said one or more records following said step of utilizing said inputted other action.

3. The method as claimed in claim 1 wherein said inputted action is stored in a separate field in said one or more records from said information stored in said database in said uploading step.

4. The method as claimed in claim 3 wherein said information stored in said database in said uploading step remains in said database separate from said inputted action and without altering, deleting, updating or otherwise modifying said information stored in said database in said uploading step.

5. The method as claimed in claim 3 wherein at least a portion of said information stored in said database in said uploading step is ignored during said utilizing step.

6. The method as claimed in claim 1 wherein said inputted action is utilized for processing of one or more other records of said data file or of an other data file uploaded into said database.

7. The method as claimed in claim 1 wherein said inputted action corrects a data error in said one or more records of said data file, reconciles a formatting discrepancy between the types of data or how data is laid out in a source file map and said data file, overrides data in said one or more records of said data file, or overrides data associated with other records or other data files.

8. The method as claimed in claim 1 wherein said computer program provides in said allowing step a list of actions that may be inputted by said system user.

9. The method as claimed in claim 8 wherein said list of actions is determined by said computer program during said processing step.

10. A method of processing tax data for sales or purchase of goods or services, said method comprising the steps of:
uploading a data file containing information regarding taxes collected or paid for a plurality of transactions into a database accessible by a computer program;
processing said data file by said computer program;
displaying to a system user of said computer program information relevant to one or more records of said data file in said database after said processing step, the system user being a customer-type user of said computer program that utilizes said computer program for processing tax data provided by the system user;
allowing the system user to input an action to be taken with respect to said displayed information;
storing said inputted action in said database in association with said one or more records to which said displayed information is relevant;
utilizing said inputted action for further processing of said one or more records; and
displaying to the system user updated information relevant to said one or more records following said utilising step;
wherein said information relevant to said one or more records displayed in said displaying steps comprises a variance analysis of said information in said data file or any updated information regarding taxes collected or paid compared to taxes calculated through a validation engine of said computer program based upon said information in said data file or any updated information.

11. A method of processing tax data for sales or purchase of goods or services, said method comprising the steps of:
uploading a data file containing information regarding taxes collected or paid for a plurality of transactions into a database accessible by a computer program;
processing said data file by said computer program; selecting by said computer program one or more jurisdictions in which one or more tax filings are recommended to be based upon said information in said data file;
wherein said information in said data file is based on proximity to where an entity for which said system user is utilizing said computer program to process tax data is determined in said selecting step to have nexus;
reporting to a system user said one or more jurisdictions recommended by said computer program, the system user being a customer-type user of said computer program that utilizes said computer program for processing tax data provided by the system user; and
displaying to the system user of said computer program a pre-determined time period of estimated tax due in said one or more jurisdictions recommended by said computer program.

12. The method as claimed in claim 11 further comprising the step of generating an interactive tax calendar continuously responsive to actions of said system user related to said one or more tax filings.

13. A method of processing tax data for sales or purchase of goods or services, said method comprising the steps of:
uploading a data file containing information regarding taxes collected or paid for a plurality of transactions into a database accessible by a computer program; processing said data file by said computer program;

selecting by said computer program one or more jurisdictions in which one or more tax filings are recommended to be based upon said information in said data file;

wherein said information in said data file is based on proximity to where an entity for which said system user is utilizing said computer program to process tax data is determined in said selecting step to have nexus; and reporting to a system user said one or more jurisdictions recommended by said computer program, the system user being a customer-type user of said computer program that utilizes said computer program for processing tax data provided by the system user;

Wherein said tax calendar is color coded and updated based upon which step of the process a particular tax filing exists that has been generated or recommended by the computer program.

14. The method as claimed in claim 13 further comprising the step of generating an interactive tax calendar continuously responsive to actions of said system user related to said one or more tax filings.

15. The method as claimed in claim 1 wherein:

said computer program includes a customer-administered mapping tool and said data file includes column headers such that processing said data file by said computer program includes obtaining by said mapping tool information from column headers of said data file and populating a source field table of said database with said information from column headers of said data file;

said source field table is information relevant to one or more records of said data file in said database;

said inputted action is the selection of a destination field from provided destination field selection options for association with each record in said source field table.

16. The method as claimed in claim 15 further comprising:

saving said source field table and said destination field table in said database as a source file map;

utilizing said source file map to process by said computer program a data file containing information regarding taxes collected or paid for a plurality of transactions.

17. The method as claimed in claim 10 wherein:

said computer program includes a customer-administered mapping tool and said data file includes column headers such that processing said data file by said computer program includes obtaining by said mapping tool information from column headers of said data file and populating a source field table of said database with said information from column headers of said data file;

said source field table is information relevant to one or more records of said data file in said database;

said inputted action is the selection of a destination field from provided destination field selection options for association with each record in said source field table.

18. The method as claimed in claim 17 further comprising:

saving said source field table and said destination field table in said database as a source file map;

utilizing said source file map to process by said computer program a data file containing information regarding taxes collected or paid for a plurality of transactions.

19. The method as claimed in claim 10 further comprising the steps of:

allowing the system user to input an other action to be taken with respect to said displayed updated information;

utilizing said inputted other action for further processing of said one or more records; and displaying to the system user updated information relevant to said one or more records following said step of utilizing said inputted other action.

20. The method as claimed in claim 10 wherein said inputted action is stored in a separate field in said one or more records from said information stored in said database in said uploading step.

21. The method as claimed in claim 20 wherein said information stored in said database in said uploading step remains in said database separate from said inputted action and without altering, deleting, updating or otherwise modifying said information stored in said database in said uploading step.

22. The method as claimed in claim 20 wherein at least a portion of said information stored in said database in said uploading step is ignored during said utilizing step.

23. The method as claimed in claim 10 wherein said inputted action is utilized for processing of one or more other records of said data file or of an other data file uploaded into said database.

24. The method as claimed in claim 10 wherein said inputted action corrects a data error in said one or more records of said data file, reconciles a formatting discrepancy between the types of data or how data is laid out in a source file map and said data file, overrides data in said one or more records of said data file, or overrides data associated with other records or other data files.

25. The method as claimed in claim 10 wherein said computer program provides in said allowing step a list of actions that may be inputted by said system user.

26. The method as claimed in claim 25 wherein said list of actions is determined by said computer program during said processing step.

* * * * *